(12) United States Patent  
McCuaig

(10) Patent No.: US 11,491,379 B2  
(45) Date of Patent: Nov. 8, 2022

(54) SPORTING APPARATUS AND INDUSTRIAL PRODUCTS

(71) Applicant: Ronald McCuaig, Dumbarton (GB)

(72) Inventor: Ronald McCuaig, Dumbarton (GB)

( * ) Notice: Subject to any disclaimer, the term of this patent is extended or adjusted under 35 U.S.C. 154(b) by 0 days.

(21) Appl. No.: 17/617,105

(22) PCT Filed: Jun. 8, 2020

(86) PCT No.: PCT/GB2020/051388  
§ 371 (c)(1),  
(2) Date: Dec. 7, 2021

(87) PCT Pub. No.: WO2020/245614  
PCT Pub. Date: Dec. 10, 2020

(65) Prior Publication Data  
US 2022/0212073 A1 Jul. 7, 2022

(30) Foreign Application Priority Data

Jun. 7, 2019 (GB) .................................... 1908164  
Sep. 2, 2019 (GB) .................................... 1912598

(51) Int. Cl.  
*A63B 60/14* (2015.01)  
*A63B 60/18* (2015.01)  
(Continued)

(52) U.S. Cl.  
CPC .............. *A63B 60/14* (2015.10); *A63B 60/08* (2015.10); *A63B 60/18* (2015.10); *B29C 43/021* (2013.01);  
(Continued)

(58) Field of Classification Search  
CPC ......... A63B 60/08; A63B 60/14; A63B 60/18; A63B 60/06; A63B 2225/05; A63B 49/08;  
(Continued)

(56) References Cited

U.S. PATENT DOCUMENTS 5,397,123 A 3/1995 Huang  
5,571,051 A 11/1996 Huang  
(Continued)

FOREIGN PATENT DOCUMENTS

GB 330243 A 6/1930  
JP S57157376 U 10/1982  
KR 200457021 Y1 12/2011

OTHER PUBLICATIONS

International Search Report and Written Opinion for application No. PCT/GB2020/051388 dated Sep. 7, 2020.  
(Continued)

*Primary Examiner* — Raleigh W Chiu  
(74) *Attorney, Agent, or Firm* — Moser Taboada

(57) ABSTRACT

There is herein described a range of sporting products comprising sucker elements, which can be used in various uses such as on products which require, for example, hand or any other type of grip contact. The grip contact may be with the feet or hands (or any other part of the body). The sporting products that the grips may be used on may comprise rackets (e.g. for tennis/badminton/squash etc.), bats (e.g. cricket/baseball/table-tennis etc.), bicycles, motorcycles, golf clubs, water sports (surfing, windsurfing) etc. The sucker elements may also be included with other sporting product such as on the inside and/or outside of running sock or shoes for example. There is also described a range of industrial products comprising sucker elements which can be used in a range of applications such as on a range of vehicle parts (e.g. bus rails, train rails, boat rails, steering wheels, motorbike handles and foot pegs etc.), industrial machinery (e.g. handles for tools such as drills, pneumatic drills etc.), flooring (e.g. decking on boats and in industrial environments), crockery, bathroom and shower flooring, and surfaces to aid disabled people.

15 Claims, 15 Drawing Sheets

(51) Int. Cl.
    *A63B 60/08*     (2015.01)
    *C09J 9/00*     (2006.01)
    *C09J 7/22*     (2018.01)
    *B29C 43/02*     (2006.01)
    *B29L 7/00*     (2006.01)
    *A63B 49/08*     (2015.01)
    *A63B 53/14*     (2015.01)

(52) U.S. Cl.
    CPC . *C09J 7/22* (2018.01); *C09J 9/00* (2013.01); *A63B 49/08* (2013.01); *A63B 53/14* (2013.01); *B29L 2007/007* (2013.01); *C09J 2301/16* (2020.08); *C09J 2301/18* (2020.08); *C09J 2301/204* (2020.08)

(58) Field of Classification Search
    CPC ..... A63B 53/14; C09J 7/22; C09J 9/00; C09J 2301/16; C09J 2301/18; C09J 2301/204; B29C 43/021; B29L 2007/007
    See application file for complete search history.

(56) References Cited

U.S. PATENT DOCUMENTS

| | | |
|---|---|---|
| 5,584,482 A | 12/1996 | Huang |
| 5,618,041 A | 4/1997 | Huang |
| 5,645,501 A | 7/1997 | Huang |
| 2003/0088946 A1 | 5/2003 | Ferguson et al. |
| 2004/0109980 A1* | 6/2004 | Chen ................ B32B 3/10 428/156 |
| 2008/0283178 A1 | 11/2008 | Huang |
| 2010/0183814 A1* | 7/2010 | Rios ................ A43B 13/04 427/387 |

OTHER PUBLICATIONS

International Preliminary Report on Patentability in application No. PCT/GB2020/051388 dated Sep. 1, 2021.

* cited by examiner

SPORTING APPARATUS AND INDUSTRIAL PRODUCTS

FIELD OF THE INVENTION

The present invention relates to a range of sporting or industrial products comprising sucker elements, which can be used in various uses such as on products which require, for example, hand or any other type of grip contact. The grip contact may be with the feet or hands (or any other part of the body). The sporting products that the grips may be used on may comprise rackets (e.g. for tennis/badminton/squash etc.), bats (e.g. cricket/baseball/table-tennis etc.), bicycles, motorcycles, golf clubs, water sports (surfing, windsurfing) etc. The sucker elements may also be included with other sporting product such as on the inside and/or outside of running sock or shoes for example. The present invention also relates to a range of industrial products comprising sucker elements which can be used in a range of industrial applications such as on a range of vehicle parts (e.g. bus rails, train rails, boat rails, steering wheels, motorbike handles and foot pegs etc.), industrial machinery (e.g. handles for tools such as drills, pneumatic drills etc.), flooring (e.g. decking on boats and in industrial environments), crockery, bathroom and shower flooring, and surfaces to aid disabled people.

BACKGROUND OF THE INVENTION

In sport it is important to be in full control of the equipment which is being used. For example, in ball games such as tennis, golf or baseball, to enable a user to hit the ball accurately, the user needs to have a good grip of the tennis racket, golf club, or baseball bat. A good grip is also essential in other sports such as fishing, where a common problem can be that the grip surface may be wet. Other examples of where a good grip is important may be handle bars of bicycles, motorcycles or on handles of water sports equipment. These tapes of grips may also become wet during use.

Consequently, material with high friction or material which is soft and comfortable to hold may be applied to sports or industrial equipment in an attempt to try to improve the user's experience.

However, these grips do not normally provide adequate friction for the user to remain in full control and do not normally prevent slippage between the user and the apparatus. This problem is worsened when the user perspires during the course of their activity, introducing moisture in between the grip and the user's skin. Moisture could also be introduced between the user and the apparatus by other means, i.e. when fishing or doing water sports (sailing, water-skiing, wind-surfing etc.) or via rain.

There are also many applications where a user may slip and/or lose grip such as in a vehicle or when using machinery.

It is therefore an object to provide an apparatus which improves the level of grip to a user.

It is also an object of the present invention to provide a method of manufacturing an apparatus which improves the level of grip to a user.

Furthermore, conventional sporting grips not only do not provide good friction when wet, but they also do not disperse moisture effectively, leading to an accumulation of sweat/water, which leads to even less friction.

It is an object of at least one aspect of the present invention to obviate or at least mitigate one or more of the aforementioned problems It is a further object of the present invention to provide an apparatus or device which improves the level of grip to a user when using or wearing sports equipment or in situations where moisture and/or sweat may occur.

SUMMARY OF THE INVENTION

According to a first aspect of the present invention there is provided a tape comprising:
   a top face and a bottom face, wherein the bottom face is capable of being wrapped around a handle or portion of on an item of a sports or industrial equipment;
   a plurality of suckers located on the top face;
   wherein at least one or a plurality of the suckers form a concave shape and are therefore capable of creating a suction action when depressed under pressure;
   the plurality of suckers comprise side walls which extend out from the top face forming the concave shape of the suckers;
   wherein an outer surface of the side walls is sloped inwards towards a central part of the concave sucker whereupon the base of the side wall is wider than the top portion which has been found to be optimal to increase the efficiency of the suction/gripping action; and
   wherein the suckers are arranged in a pattern to allow moisture and/or sweat to escape from the tape.

According to a further aspect of the present invention there is provided a tape comprising:
   a top face and a bottom face, wherein the bottom face is capable of being wrapped around a handle and/or or onto a portion of on an item of a sports or industrial equipment;
   a plurality of suckers located on the top face;
   wherein at least one or a plurality of the suckers form a concave and/or convex shape and are therefore capable of creating a suction action when depressed under pressure;
   wherein the suckers are arranged in a pattern to allow moisture and/or sweat to escape from the tape.

The tape may be a grip tape.

The present invention therefore relates to a range of sporting products comprising sucker elements, which can be used in various uses such as on products which require, for example, hand or any other type of grip contact.

The grip contact may be with the feet or hands (or any other part of the body). The sporting products that the grips may be used on may comprise rackets (e.g. for tennis/badminton/squash etc.), bats (e.g. cricket/baseball/table-tennis etc.), bicycles, motorcycles, golf clubs, water sports (surfing, windsurfing) etc. The sucker elements may also be included with other sporting product such as on the inside and/or outside of running sock or shoes for example.

The present invention also relates to a range of industrial products comprising sucker elements which can be used in a range of applications such as on a range of vehicle parts (e.g. bus rails, train rails, boat rails, steering wheels, motorbike handles and foot pegs etc.), industrial machinery (e.g. handles for tools such as drills, pneumatic drills etc.), flooring (e.g. decking on boats and in industrial environments), crockery, bathroom and shower flooring, and surfaces to aid disabled people.

The grip tape of the present invention may be in the form of an elongate tape which may be wound around a sports or industrial article where improved grip is required.

The grip tape may be manufactured from materials which may be substantially water impermeable thereby preventing the grip tape from becoming wet and/or impregnated with water and/or sweat.

Alternatively, the grip tape may be a sheet-like material.

Typically, all or substantially all of the suckers are concave shaped.

The grip may also comprise a range of recessed channel regions which have been found to be extremely effective in dissipating moisture and/or sweat away from the grip and a user. The recessed channel regions maybe in the form of elongate indentations into the grip which allow moisture and/or sweat to stream away.

The recessed channels may extend optionally continuously from one end of the grip to another.

The present invention therefore relates to a sports or industrial grip tape which comprises suckers on its outer and/or inner surface which allow sweat and/or moisture to run down channels between the suckers and dissipate away from a hand or contact point.

The suckers of the present invention may be located on raised island regions with recessed channel regions located between the island regions and suckers thereby allowing moisture and/or sweat to dissipate away from a user.

Typically, the plurality of suckers may have circular shaped sidewalls i.e. circular diametric cross-section.

The grip tape may be manufactured by any suitable process such as injection moulding/cast moulding/dip moulding etc.

The suckers may form a convex shape, wherein when pressure is applied, suction is increased and/or applied to a user when gripping occurs.

At least one or more or all of the suckers may be in the form of a concave shape.

In particular embodiments, at least some of the suckers may also be in the form of a convex shape.

The suckers may be formed from a range of different shapes and thicknesses.

The suckers may be shaped in any appropriate form and are usually circular in shape. However, other shapes for the suckers are possible such as any of oblong, obtuse, square, triangular and oval etc.

It has been found that in some embodiments it is preferred to have an outer surface of the side walls sloped inwards towards a central part of the concave sucker whereupon the base of the side wall is wider than the top portion this has been found to be optimal to increase the efficiency of the suction/gripping action. The top of the side walls may be flat to ensure comfort for a user. The upper surface of the concave sucker may be smooth with no undercuts on the side walls which allows whole pad section on which the plurality of suckers are formed to be evenly compressed under pressure.

Therefore, in some embodiments at least one or a plurality of the suckers may be sloped inwards towards a central part of the concave sucker whereupon the base of the side wall is wider than the top portion this has been found to be optimal to increase the efficiency of the suction/gripping action.

The circular shaped side walls may therefore slope inwards to the central part of the suckers, and protrude from the top face. The base of the side wall may be wider than the top portion, which has been found to optimise the gripping/sucking action. The side wall may therefore be wider at the bottom and tapers in reduced width towards the top of the sidewall.

The thickness of the sidewall may therefore vary from the bottom where it is maximum, to the top where it is minimum. This has been shown to provide excellent grip, whilst maintaining improved comfort for the user. An advantage of this design is that the upper part of the side walls are preferably not able to fold back against themselves, and therefore form a superior suction and also provide greater comfort to a user. When pressure is applied to the suckers, the side walls may flatten out easily, without leaving an uncomfortable bump which the user may feel when using the sports industrial equipment. Preferably, the sidewalls slope in to the centre of the sucker at an angle of about 20-70 degrees, or preferably 30-70 degrees.

The suckers in the present application may have a diameter of about 0.2-2 cm, and preferably about 0.5-1 cm. The maximum depth of the concave or convex shape is determined by the thickness of the material but may be about 0.05-5 mm, and preferably about 0.5-2 mm. The size of the suckers determines the amount of suction that may be achieved.

Therefore, the present invention generally covers raised suckers which may extend out from a surface of the pad by about 0.01-5 mm, about 0.01-2 mm, about 0.1-2 mm, about 0.1-1 mm. The suckers may have no undercuts on the sidewalls of the suckers. As previously stated, this allows the whole pad section to be evenly compressed under pressure with no 'flappy' part which can fold on top of itself to create an uneven surface.

Located between the suckers there may be a plurality of recessed channels which are located and connected along the length of a grip and/or pad section. The plurality of recessed channels may allow moisture and/or sweat to easily dissipate away during use. The uses of the suckers may be all of the sporting uses described above as well as any industrial use.

The recessed channels may be integrally formed in the grip and/or pad section or may be scored into the grip and/or pad section once fitted and/or formed.

The suckers of the present invention may also have smooth edges, ensuring good grip/suction, and comfort for the user.

The grip tape and suckers may be made from a silicone, silicone-like rubber, rubber-like and/or plastics material. The membrane may be flexible and resiliently deformable.

The grip tape may comprise a backing membrane which the plurality of suckers are attached to.

The membrane may be made from a woven and/or non-porous material and the suckers may be made from silicone, silicone based, a rubber, rubber-like and/or plastics material.

The suckers may protrude out from the outer face, with the aim of achieving grip and suction. An upper surface of the suckers may extend out from the outer face by about 0.1-5 mm, about 0.1-2 mm, about 0.5-2 mm, or about 1-2 mm. The protruding outer surface may be circular in shape or any other appropriate shape as described above.

The suckers also may allow moisture and/or sweat to escape from the tape. The moisture and/or sweat may escape through the shape of the suckers, or through the pattern which the suckers are arranged.

The suckers may form a pattern on the grip tape and in between the suckers they may be connected channels which allow moisture and/or sweat to escape and travel out from and away from the grip tape.

The length of the tape may be substantially greater than the width of the tape. The tape may be stored on a roll.

The grip tape may therefore be in the form of an elongate substantially flat tape which may be wound and rolled on a roll ready for use.

The bottom face may be coated with an adhesive. The adhesive may be any suitable form of adhesive such as a resin and/or solvent based glue.

Alternatively, the bottom face may also comprise a plurality of suckers which may be attached to another object. The suckers may be a combination of convex or concave suckers. Alternatively, all of the suckers may be either convex or concave.

The side wall may be wider at the bottom and may taper in a reduced width towards the top of the side wall of the sucker.

The base of the side wall may be about double the width of the top of the side wall.

An outer surface of the side walls may slope inwards at an angle of about 20-70 degrees or about 30-70 degrees.

The suckers may have a diameter of about 0.2-2 cm or about 0.5-1 cm and the maximum depth of the concave shape of the sucker may be about 0.05-5 mm or about 0.5-2 mm. Alternatively, the suckers may be micro suckers. The micro suckers may have a diameter of about 0.01-0.5 mm, about 0.01-0.4 mm, about 0.05-0.2 mm, about 0.1-0.2 mm, or about 0.01-0.2 mm.

The maximum depth of the concave or convex shape may be about 0.001-0.2 mm, about 0.001-0.1 mm, about 0.01-0.2 mm, about 0.01-0.1 mm, about 0.005-0.1 mm, or about 0.1-0.2 mm The pattern of suckers may be comprised of a group of smaller diameter suckers and a group of larger diameter suckers.

Alternatively, the suckers may all be of the same size and/or shape.

The pattern of the suckers may alternate along the length of the tape between a larger diameter sucker and a smaller diameter sucker.

The pattern may also comprise any other combination of larger and smaller diameter suckers. For example, there may be four large suckers, three smaller suckers, three large suckers, and then four smaller suckers etc.

The suckers may be optimised for moisture rich environments. The suckers may also function when submersed in liquid such as water.

The top face may be suitable for being gripped by the user of the sports equipment.

The bottom face may comprise a plurality of suckers.

The grips of the present invention may therefore be retrofitted to existing handles or portions of sports or industrial items.

In another aspect of the present invention, there is provided a sports or industrial grip comprising:
an elongated, substantially cylindrical grip element;
wherein the grip element comprises a top face and a bottom face;
a plurality of suckers located on the top face;
wherein the bottom face is capable of being attached to a handle on an item of sports or industrial equipment
wherein the suckers are arranged in a pattern to allow moisture and/or sweat to escape from the grip.

Typically, the suckers may form a concave shape and are therefore capable of creating a suction action when depressed under pressure and the plurality of the suckers have circular shaped side walls;

Typically, an outer surface of the side walls may be sloped inwards towards a central part of the concave sucker whereupon the base of the side wall is wider than the top portion which has been found to be optimal to increase the efficiency of the suction/gripping action.

The grip may also comprise a range of recessed channel regions which have been found to be extremely effective in dissipating moisture and/or sweat away from the grip and a user. The recessed channel regions may be in the form of elongate indentations into the grip which allow moisture and/or sweat to stream away. The recessed channels may extend from one end of the grip to another.

In another aspect of the present invention, there is provided a sports or industrial grip comprising:
an elongated, substantially cylindrical grip element;
wherein the grip element comprises a top face and a bottom face;
a plurality of suckers located on the top face;
wherein the bottom face is capable of being attached to a handle on an item of sports or industrial equipment
wherein the suckers may form a concave shape and are therefore capable of creating a suction action when depressed under pressure and the plurality of the suckers have circular shaped side walls;
wherein an outer surface of the side walls is sloped inwards towards a central part of the concave sucker whereupon the base of the side wall is wider than the top portion which has been found to be optimal to increase the efficiency of the suction/gripping action;
wherein the suckers are arranged in a pattern to allow moisture and/or sweat to escape from the grip.

The grip may also comprise a range of recessed channel regions which have been found to be extremely effective in dissipating moisture and/or sweat away from the grip and a user. The recessed channel regions maybe in the form of elongate indentations into the grip which allow moisture and/or sweat to stream away. The recessed channels may extend from one end of the grip to another.

The previous alternative features which applied to the sports grip tape may also apply to the sports grip as described above.

According to yet another aspect of the present invention, there is provided a sports or industrial pad comprising:
a top face and a bottom face, wherein the bottom face may be suitable for being attached to an item of sports or industrial equipment;
a plurality of suckers located on the top face;
wherein the suckers form a concave shape and are therefore capable of creating a suction action when depressed under pressure and the plurality of the suckers have circular shaped side walls;
wherein an outer surface of the side walls is sloped inwards towards a central part of the concave sucker whereupon the base of the side wall is wider than the top portion which has been found to be optimal to increase the efficiency of the suction/gripping action;
wherein the suckers are arranged in a pattern to allow moisture and/or sweat to escape from the grip.

The previous alternative features described above which applied to the sports or industrial grip tape and the sports grip may also apply to the sports pad as described above.

The tape or pad may also comprise a silicone, silicone-like, rubber, rubber-like and/or plastics membrane which may be flexible and resiliently deformable.

The silicone, silicone-like, rubber, rubber-like and/or plastics membrane may be flat or may comprise a series of thin parallel rubber, rubber-like and/or plastics material strips in the form of small ridges. The parallel strips of rubber, rubber-like or plastics material strips are able to expand and contract during use i.e. stretch and expand.

There may be a silicone, silicone-like, rubber, rubber-like and/or plastics-based pad section. There may be about 2-50 suckers on this front pad section or about 10-30 suckers. The suckers may be located substantially evenly over a sectional area.

The suckers may be of all the same size and shape or there may be a variety of shapes and sizes.

The pad sections may have a plurality of suckers integrated into the pad sections. The suckers are flexible and resiliently deformable under pressure. The pad sections may be attached directly or may be attached to the base on a silicone, silicone-like rubber, rubber-like and/or plastics membrane. The suckers may therefore be formed in a unitary manner with the pad sections.

It should be appreciated that any form and pattern of suckers may be used and for different applications.

Suckers used in the present invention may protrude out. The shape and orientation as to how the suckers extend out has been found to be crucial to obtain maximum grip and comfort for a user. In one embodiment the outer side walls of the suckers may extend substantially vertically away from the flexible pad sections.

In a further embodiment the outer side walls of the suckers may extend in a circular shape with the side walls themselves being substantially 'C'-shaped. The outer side walls of the suckers may compress into the flexible pad section to ensure comfort for a user.

Alternatively, the suckers may have circular shaped side walls wherein the outer surface of the side walls are sloped inwards towards the central part of the concave sucker. The sucker may therefore be formed from a main central area which is concave shaped and circular side walls with their outer walls sloping inwards.

The base of the side wall of the sucker may be wider than the top portion which has been found to be optimal to increase the efficiency of the suction/gripping action. The side wall may therefore be wider at the bottom and tapers in reduced width towards the top of the side wall of the sucker. The base of the side wall may be about double the width of the top of the side wall.

The thickness of the side wall may therefore vary from the bottom where it is at a maximum to a minimum at the top. This provides a highly flexible structure that has been found to provide maximum suction and gripping action but also improved comfort for a user. An advantage of this design is that the upper part of the side walls are not able to fold back against themselves and therefore form a superior suction and also provide greater comfort to a user. By preventing the sidewall from folding back prevents any overlap of material which can rub against the user and form blisters and be uncomfortable for a user. Additionally, any material which folds back has been found to significantly reduce the efficiency of the gripping action.

The circular outer side walls may be compressed into the flexible pad section to ensure comfort for a user.

The side walls of the suckers may also slope inwards towards to the central concave area of the sucker with a curved convex wall shape. This has also been found to increase the efficiency for the user and to prevent any of the material folding back against itself.

The convex shape of the suckers may have a diameter of about 0.2-2 cm and preferably about 0.5-1 cm. The maximum depth of the convex shape is determined by the thickness of the material but may be about 0.05-5 mm and preferably about 0.5-2 mm. This determines the amount of suction action that may be achieved.

As an alternative or in addition to the suckers there may also be a section and/or series of matrix webbing which may be made from silicone and/or rubber-like material.

The pads may be made from any suitable material such as silicone, silicone-like rubber, rubber-like and/or plastics material that provides high friction.

Alternatively, the pads may be attached using adhesive and/or mechanical attachment such as sewing and/or stapling. The pads may therefore be connected to a component via any suitable means such as sewing, gluing, hook and loop fastener etc.

The pads may therefore provide further traction and grip for a user.

The suckers on the pads may be small protrusions or alternatively indentations, or a combination thereof, which are capable of forming a sucking action to attach themselves to a user. The suckers can be made of silicone or rubber or similar and formed into any shape to allow traction to take place. The suckers can comprise a flat, raised or indented profile.

Further optional features disclosed in relation to each aspect of the invention correspond to further optional features of each other aspect of the invention.

According to a further aspect of the present invention there is provided an industrial component or vehicle component comprising an area with suckers which can be used to improve grip and/or traction.

According to another aspect of the present invention, there is provided a method of manufacturing sporting and industrial components with suckers.

This method may include removing the component with suckers from the tool from which it is made. For example, if the component is dip moulded onto a mandrel, the invention may be a novel way to extract the component from the mandrel. This may be by cutting in a diagonal/helical fashion, thereby creating the tube into a tape.

The component may be a tape, tube, grip, pad, or sheet.

The present invention therefore also relates to forming a tube type of grip which may be in the form of a sleeve i.e. a tubular section which may be fitted onto and over a handle or articles according to the present invention where improved grip is required.

The at least one sucker area may have a rear face which is attached to the industrial component or vehicle component and the outer section may comprise a series of suckers.

Alternatively, the sucker area may be in a tubular form and/or mouldable.

There may be a silicone, silicone-like rubber, rubber-like and/or plastics membrane which may be flexible and resiliently deformable.

The silicone, silicone-like rubber, rubber-like and/or plastics membrane may be flat or may comprise a series of thin parallel rubber, rubber-like and/or plastics material strips in the form of small ridges. The parallel strips of rubber, rubber-like or plastics material strips are able to expand and contract during use i.e. stretch and expand.

There may be a rubber, rubber-like and/or plastics-based pad section. There may be about 2-50 suckers on this front pad section or about 10-30 suckers. The suckers may be located substantially evenly over a sectional area. The suckers may be of all the same size and shape or there may be a variety of shapes and sizes.

The pad sections may have a plurality of suckers integrated into the pad sections. The suckers are flexible and resiliently deformable under pressure. The pad sections may be attached directly or may be attached to the silicone, silicone-like rubber, rubber-like and/or plastics membrane.

The suckers may therefore be formed in a unitary manner with the pad sections. It should be appreciated that any form and pattern of suckers may be used and for different applications.

Suckers used in the present invention may protrude out. The shape and orientation as to how the suckers extend out has been found to be crucial to obtain maximum grip and comfort for a user. In one embodiment the outer side walls of the suckers may extend substantially vertically away from the flexible pad sections.

In a further embodiment the outer side walls of the suckers may extend in a circular shape with the side walls themselves being substantially 'C'-shaped. The outer side walls of the suckers may compress into the flexible pad section to ensure comfort for a user.

Alternatively, the suckers may have circular shaped side walls wherein the outer surface of the side walls are sloped inwards towards the central part of the concave sucker. The sucker may therefore be formed from a main central area which is concave shaped and circular side walls with their outer walls sloping inwards.

The base of the side wall of the sucker may be wider than the top portion which has been found to be optimal to increase the efficiency of the suction/gripping action. The side wall may therefore be wider at the bottom and may taper in reduced width towards the top of the side wall of the sucker. The base of the side wall may be about double the width of the top of the side wall.

The thickness of the side wall may therefore vary from the bottom where it is at a maximum to a minimum at the top. This provides a highly flexible structure that has been found to provide maximum suction and gripping action but also improved comfort for a user. An advantage of this design is that the upper part of the side walls are not able to fold back against themselves and therefore form a superior suction and also provide greater comfort to a user. Preferably, the outer surface of the side walls slope inwards at an angle of about 20-70 degrees or preferably about 30-70 degrees. This has been found to be a specific advantage in that with no undercuts provides improved suction and grip for a user.

The suckers as defined in the application and throughout the present application may have a diameter of about 0.2-2 cm and preferably about 0.5-1 cm. The maximum depth of the concave shape of the sucker may be determined by the thickness of the material but may have a maximum depth of about 0.05-5 mm and preferably about 0.5-2 mm. This determines the amount of suction action that may be achieved.

The circular outer side walls may be compressed into the flexible pad section to ensure comfort for a user.

The present invention also covers the method of construction of the suckers. During the method of manufacture a core plastic or metal insert is used to form the concave area in the middle of the sucker by being pressed into a flat silicone, silicone-like rubber, rubber-like and/or plastics material. The core insert is fundamental to the formation of the suckers as the suckers are formed with no undercuts showing i.e. no 'nappy' parts. The specific technical advantage of forming these suckers in this manner is that the outer surface of the side walls can be shaped to slope inwards and have no undercuts and are therefore allowed to retract and flatten out easily under pressure when a person applies pressure to the sucker.

The side walls of the suckers may also slop inwards towards to the central concave area of the sucker with a curved convex wall shape. This has been found to further improve the retraction and flattening of the side walls under pressure from a user.

The convex shape of the suckers may have a diameter of about 0.2-2 cm and preferably about 0.5-1 cm. The maximum depth of the convex shape is determined by the thickness of the material but may be about 0.05-5 mm and preferably about 0.5-2 mm. This determines the amount of suction action that may be achieved.

The protruding circular side walls extending around the concave portion of the suckers may protrude out from raised island-like areas on the front and heel pad sections by about 0.02-2 mm or preferably about 0.05-0.5 mm.

There may also be a channel between the island-like areas which not only provides additional flexibility but also additional areas to create suction and gripping. The channels may have a width of about 0.1-10 mm or preferably about 1-3 mm and a depth of about 0.05-3 mm and preferably about 0.5-2 mm.

As an alternative or in addition to the suckers there may also be a section and/or series of matrix webbing which may be made from silicone and/or rubber-like material.

The pads may be made from any suitable material such as rubber-like material that provides high friction.

The suckers in the present invention may therefore also be made from any suitable rubber, rubber-like and/or plastics membrane e.g. a silicone-based material.

Alternatively, the pads may be attached using adhesive and/or mechanical attachment such as sewing and/or stapling. The pads may therefore be connected to a component via any suitable means such as sewing, gluing, hook and loop fastener etc.

The pads may therefore provide further traction and grip for a user.

The suckers on the pads may be small protrusions or alternatively indentations, or a combination thereof, which are capable of forming a sucking action to attach themselves to a user.

The suckers can be made of silicone or rubber or similar and formed into any shape to allow traction to take place. The suckers can comprise a flat, raised or indented profile.

It has been found that having two different types of channel arrangements such as channels extending across and in between the suckers and further additional channels in between the different wrapped portions of the elongate grip member has extremely efficient dissipation of water away from the grip member during use.

In particular embodiments, the grip tape may comprise three different sizes of suckers. There may be a small cross-sectional diameter sucker, mid-size suckers and a larger cross-sectional diameter sucker. Located in between the suckers there may be a series of channels allowing water and/or sweat to dissipate away.

On wrapping the grip tape, a pre-wrap portion may also be initially wound onto the sporting apparatus or industrial member intended to be wrapped. The pre-wrap portion may provide additional comfort and/or adhesion.

The grip member may comprise a plurality of layers such as be comprised of three separate layers. There may be an outer strip layer 1 which comprises a series of suckers. There may then be an intermediary adhesive layer which attaches the outer strip layer to an adhesive backing layer. The grip member may be wound around any type of suitable sporting or industrial member to be wrapped.

In further embodiments, the grip member may comprise two different sizes of suckers. First of all, there may be a larger cross-sectional diameter sucker and a smaller cross-sectional diameter sucker. There may be a pattern formed between two sizes of suckers. Typically, the larger suckers may have a cross-section diameter of about 5-20 mm or about 5-10 mm. Furthermore, the suckers having a smaller cross-section may have a diameter of about 0.05-4 mm or about 0.1-4 mm.

It is important to note that both types of suckers may be concave in shape and protrude up from the surface of the elongate grip member. The suckers may extend out from a surface of the grip member by about 0.01-5 mm, about 0.01-2 mm, about 0.1-2 mm, about 0.1-1 mm. The suckers may have no undercuts of the sidewalls of the suckers.

There may also be channels connected along and down the length of the grip tape. There may be a single type of channels or different channels connected down the length of the grip tape.

According to a further aspect of the present invention there is provided a method for manufacturing a grip tape comprising:
   providing a substantially cylindrical mandrel;
   inserting the substantially cylindrical mandrel into a heated compartment;
   applying heat to the substantially cylindrical mandrel;
   dipping the heated substantially cylindrical mandrel into a liquid polymer thereby coating at least a portion of the substantially cylindrical mandrel;
   inserting the coated substantially cylindrical mandrel into a heated compartment to cure the liquid polymer;
   allowing the cured and coated substantially is logical mandrel to cool;
   removing the cured polymeric material from the substantially cylindrical mandrel;
   whereupon a sleeve of polymeric material and a substantially cylindrical shape is formed.

The polymeric material in the substantially cylindrical-shaped form may be cut in a variety of ways to form an elongate grip tape section.

The elongate grip tape section may be rolled onto cylindrical role until it is ready to be used and wound onto part of a sporting or industrial device as described above.

Alternatively, any other form of compression moulding or injection moulding process may be used.

The formed grip tape may be as described above in any of the above aspects.

The grip tape may comprise a pattern of suckers formed between two sizes of suckers.

Typically, there may be a larger type of suckers which have larger cross-section diameter of about 5-20 mm or about 5-10 mm.

There may also be a smaller type of suckers which have a smaller cross-section diameter of about 0.05-4 mm or about 0.1-4 mm.

The suckers may be concave in shape and protrude up from the surface of the elongate grip member. Therefore, the suckers may extend out from a surface of the grip member by about 0.01-5 mm, about 0.01-2 mm, about 0.1-2 mm, or about 0.1-1 mm. The suckers have no undercuts on the sidewalls of the suckers.

A further important feature of the grip member is that there may be recessed channels which are interconnected and extend along down the length of the elongate grip member. The recessed channels may extend around and/or in between the arrangement of the suckers.

The recessed channels may extend in a substantially longitudinal arrangement along and down the length of the elongate grip member. The recessed channels may form depressed channels into the elongate grip member by about 0.01-2 mm, about 0.01-1 mm, about 0.1-2 mm, about 0.1-1 mm, or about 0.5-1 mm.

The function of the recessed channels may be to dissipate moisture and/or sweat away from a user. This improves the efficiency and/or performance of the grip and adhesion to a user. The recessed channels may be formed in the dip coating process.

The grip member may be cut such as in any circumferential or linear manner to form an elongate tape. The elongate tape may then be used as a grip and wound onto a range of sporting and industrial apparatus and/or devices.

According to a further aspect of the present invention there is provided a method for manufacturing a grip tape or pad according to the present invention using a compression moulding or injection moulding process.

According to a further aspect of the present invention there is provided a method for manufacturing a grip tape or pad using a compression moulding process comprising:
   providing a first part and a second part which form two separate halves of a compression moulding tool;
   the first part comprising a series of elongate depressed sections;
   the second part comprising a further series of elongate depressed sections which comprise a series of small indentations and/or protrusions which are capable of forming sucker elements; and
   wherein the second part also comprises a series of channel sections.

Typically, there may be any suitable number of elongate depressed sections in the first and second parts. The elongate depressed sections may extend from one end to the other of the tape.

Material to be depressed and to be formed into tape or any other article according to the present invention may therefore be inserted into the elongate depressed sections for compression to form the tape or articles. The first and second parts may therefore be compressed against one another.

The formed suckers may be concave and/or convex in shape.

In particular embodiments, the first part may also comprise a further series of elongate depressed sections which comprise a series of small indentations and/or protrusions which are capable of forming sucker elements. The elongate depressed sections may extend continuously from one end to the other end of the tape.

The series of channel sections in the second part may also be interconnected allowing water and/or sweat to dissipate away in the formed tape during use.

The compression moulding tool may be used to form a tape according to the present invention as described above in any of the embodiments.

The formed tape may therefore be elongate and comprises a series of suckers on one or both sides. On one side of the form tape there may be a channel which may be interconnected along the tape which may be used to allow moisture and/or sweat to dissipate away during use. It is optional whether suckers may be formed on the other side of the tape as well.

The tape may also comprise a backing layer which may be adhesive.

According to a yet further aspect of the present invention there is provided a method for manufacturing a grip tape or pad using a compression moulding process comprising:
   providing a top plate and a bottom plate which are capable of being forced against one another;

a cavity section formed between the top plate on the bottom plate into which material to be compressed is capable of being inserted;

whereupon on compression of the top and bottom plate material inserted into the cavity section is formed into a tape or article.

The formed tape or article may be as described above

The compression moulding process may also comprise a handle and a dowel pin and bushing.

Between the top plate and the bottom plate there may also be formed an opening bar slot 1930.

Located between the top plate and the bottom plate there may be a cavity area into which material may be placed to be compressed into an article such as a grip tape according to the present invention.

The compression moulding apparatus may also comprise an upper movable mould half and a lower fixed mould half. The mould halves may be forced against one another to form and elongate tape or article according to the present invention.

BRIEF DESCRIPTION OF THE DRAWINGS

Non-limiting example embodiments the present invention will now be described with reference to the accompanying drawings in which.

DETAILED DESCRIPTION

The present invention therefore relates to a range of sporting products comprising sucker elements, which can be used in various uses such as on products which require, for example, hand or any other type of grip contact. The grip contact may be with the feet or hands (or any other part of the body). The sporting products that the grips may be used on may comprise rackets (e.g. for tennis/badminton/squash etc.), bats (e.g. cricket/baseball/table-tennis etc.), bicycles, motorcycles, golf clubs, water sports (surfing, windsurfing) etc. The sucker elements may also be included with other sporting product such as on the inside and/or outside of running sock or shoes for example.

The present invention also relates to a range of industrial products comprising sucker elements which can be used in a range of applications such as on a range of vehicle parts (e.g. bus rails, train rails, boat rails, steering wheels, motorbike handles and foot pegs etc.), industrial machinery (e.g. handles for tools such as drills, pneumatic drills etc.), flooring (e.g., decking on boats and in industrial environments), crockery, bathroom and shower flooring, and surfaces to aid disabled people.

Figure 1:
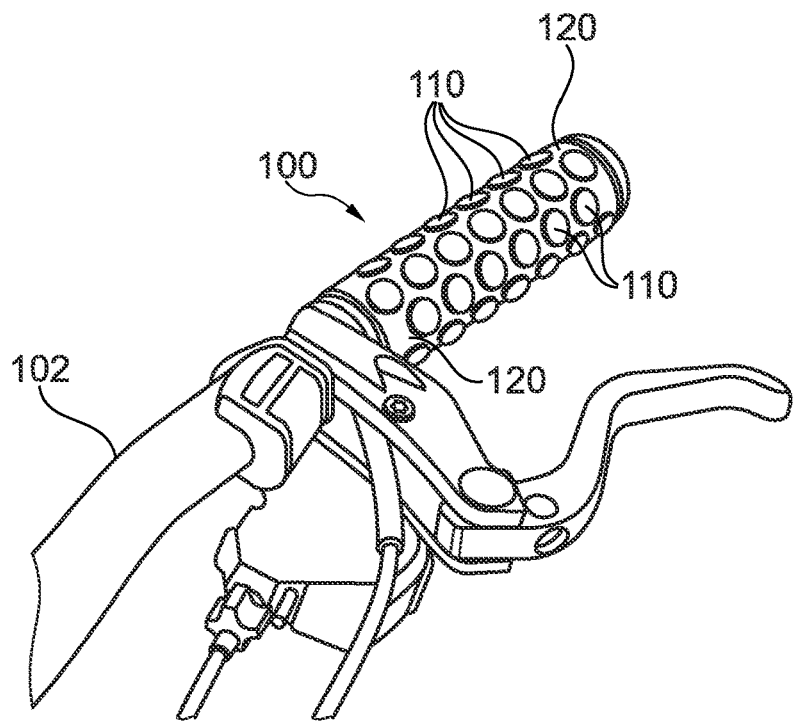
FIG. 1 shows an embodiment of the present invention, showing a grip on a handle of a bicycle.

FIG. 1 shows an embodiment of the present invention, showing a grip 100 on a bicycle handlebar 102. A plurality of suckers 110 can be seen, arranged in a pattern to allow moisture and/or sweat to escape from the grip 200.

The suckers 110 are designed to increase the friction available to the user when gripping the handlebars 102 of the bicycle, preventing the hands from sliding and therefore potentially losing control of the bicycle. Remaining in full control of the bicycle requires the user to have a firm grip of the handlebars 102. The grip 200 and suckers 110 may be made of a silicone, silicone-like, rubber, rubber-like and/or plastics material.

The grip 100 may be flexible and resiliently deformable. The grip 100 may be formed from wound tape. The tape may comprise an adhesive backing which may be attached (i.e. adhered) to the handlebars 102.

The grip 100 may also comprise a backing membrane which is made from a different material than the suckers 110. The backing membrane may be made of a woven or non-porous material, whilst the suckers 110 may be made from a silicone, silicon-like, rubber, rubber-like and/or plastics material.

The suckers 110 are arranged in a pattern so as to allow excess moisture (caused by perspiration or rain etc.) to escape from the grip 100. The pattern shows the suckers 110 regularly spaced in each direction, with all of the suckers having the same size. This pattern should not be taken to be limiting, but merely an example of a pattern.

The suckers may be arranged in regular or irregular lines for example, and they may be different sizes (diameter and depth). The cross-section diameter of the suckers may range from about 1-10 mm or preferably about 5 mm.

The suckers 110 are positioned on a top face 120 of the grip 100, whilst the bottom face (not shown) is positioned in contact with the bicycle handlebars 102.

Although not shown, the grip 100 may also comprise a range of recessed channel regions which have been found to be extremely effective in dissipating moisture and/or sweat away from the grip 100 and a user. The recessed channel regions are elongate indentations into the grip 100 which allow moisture and/or sweat to stream away.

It should be easily envisaged that the grip 100 can be used in a multitude of other sporting and industrial equipment, for example but not limited to: golf club grips (see FIG. 3), other bicycle grips, grips for water sports equipment—windsurfing, sailing, kayak paddles etc.

Figure 2:
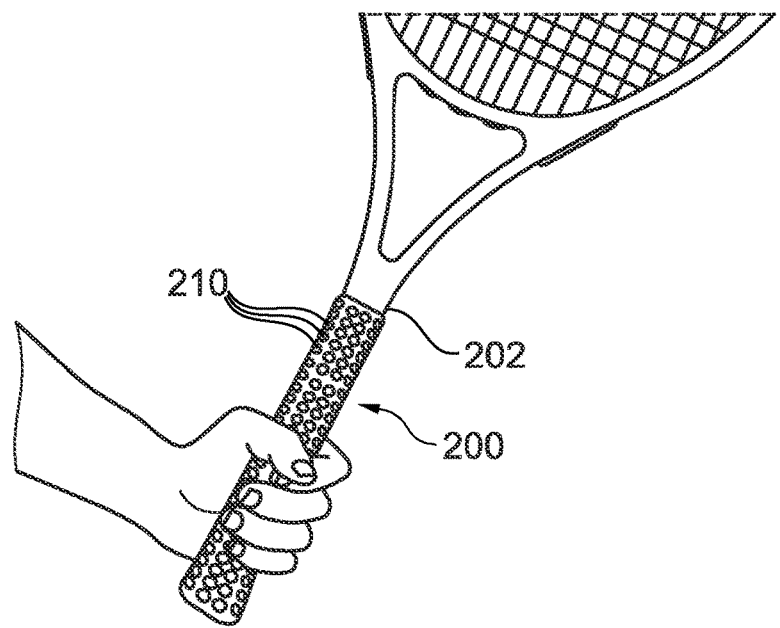
FIG. 2 shows an embodiment of the present invention, showing tape wrapped around the handle of a tennis racket.

FIG. 2 shows an embodiment of the present invention, showing grip tape 200 wrapped around a tennis racket handle 202. Similar to the grip 100 shown in FIG. 1, the tape 200 comprises a plurality of suckers 210 which are arranged in a pattern. The tape 200 is usually sold in a roll, and is usually elongate, with a length much longer than the width. The tape 100 is wrapped around the tennis racket handle 102 so as to allow moisture like sweat to escape from the tape 200. This is facilitated by the pattern of the suckers 210.

The suckers 210 may be small protrusions or alternatively indentations, or a combination thereof, which are capable of forming a sucking action to attach themselves to the user's skin (or clothing). The suckers 210 can be formed in any shape so as to allow traction to take place.

The tape 200 and suckers 210 may be made of a silicone, silicone-like, rubber, rubber-like and/or plastics material. The tape 200 may be flexible and resiliently deformable.

The tape 200 may also comprise a backing membrane which is made from a different material than the suckers 210. The backing membrane may be made of a woven or non-porous material, whilst the suckers 210 may be made from a silicone, silicone-like, rubber, rubber-like and/or plastics material.

The suckers 210 are arranged in a regular pattern, however other patterns may easily be conceived of.

Although not shown, the tape 200 may also comprise a range of recessed channel regions which have been found to be extremely effective in dissipating moisture and/or sweat away from the grip tape 200 and a user. The recessed channel regions are elongate indentations into the grip 200 which allow moisture and/or sweat to stream away.

Figure 3:
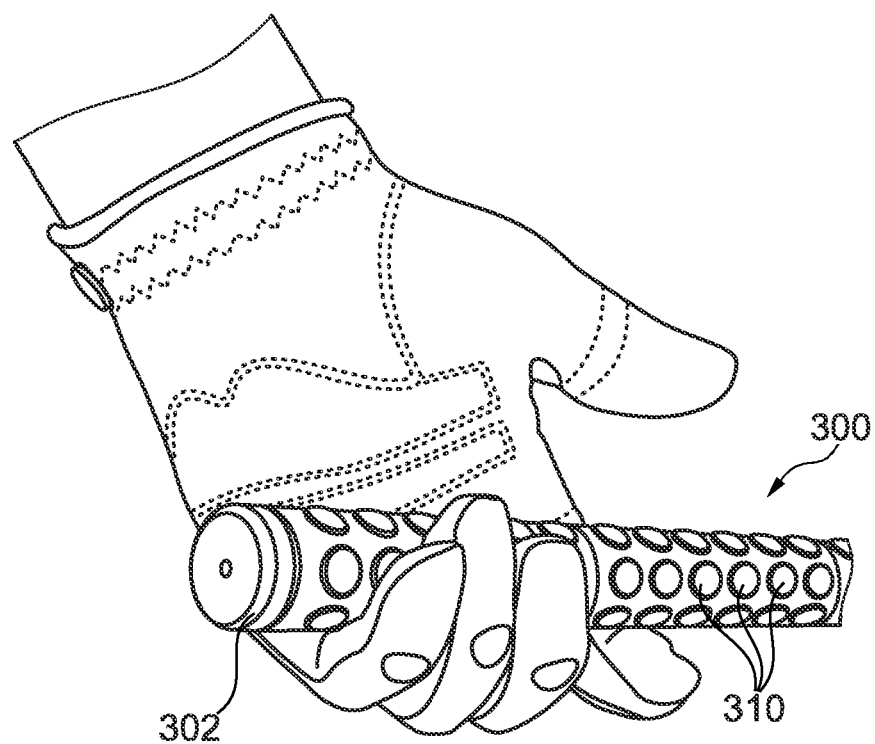
FIG. 3 shows an embodiment of the present invention, showing a grip on the handle of a golf club.

FIG. 3 shows an embodiment of the present invention, showing a grip 300 on a golf club handle 302. Located on the grip 300 there is a plurality of suckers 310. The suckers 310 are suitable for use with gloves as well as against a user's skin.

Although not shown, the grip 300 may also comprise a range of recessed channel regions which have been found to be extremely effective in dissipating moisture and/or sweat away from the grip tape 300 and a user. The recessed channel regions are elongate indentations into the grip 300 which allow moisture and/or sweat to stream away.

Figure 4:
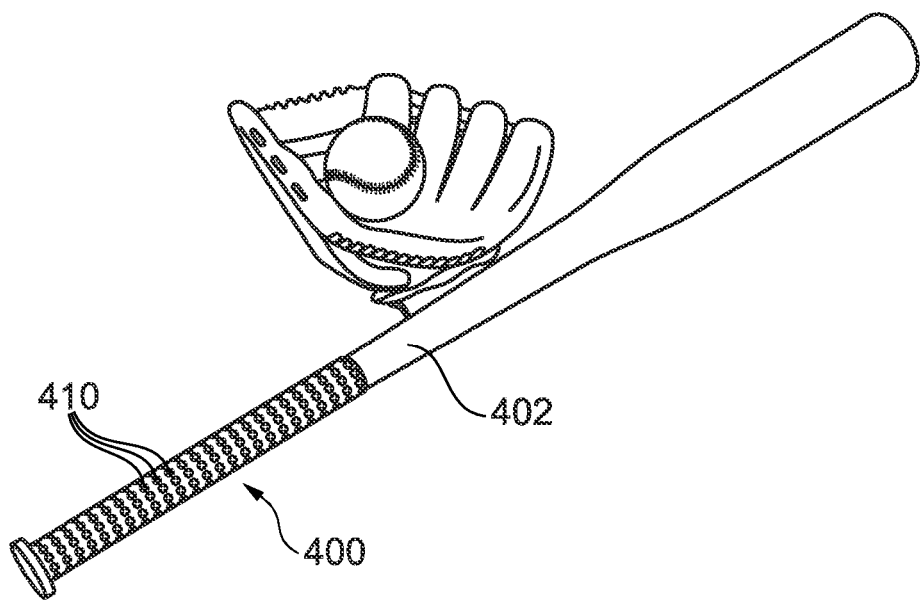
FIG. 4 shows an embodiment of the present invention, showing tape wrapped around the handle of a baseball bat.

FIG. 4 shows an embodiment of the present invention, showing tape 400 wrapped around a baseball bat handle 402. Alternatively, a grip 400 in a sleeve forum could be used to insert over the baseball bat handle 402. It should be easily envisaged that the embodiments showing grips could be used with tape and vice versa. Located on the grip 400 there is a plurality of suckers 410.

Although not shown, the tape 400 may also comprise a range of recessed channel regions which have been found to be extremely effective in dissipating moisture and/or sweat away from the grip tape 400 and a user. The recessed channel regions are elongate indentations into the grip 400 which allow moisture and/or sweat to stream away.

Figure 5:
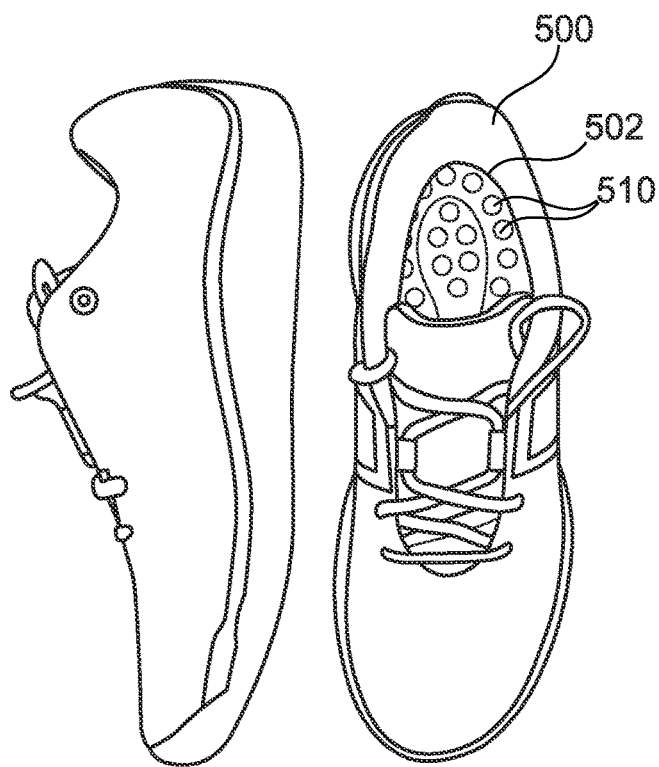
FIG. 5 shows an embodiment of the present invention, showing a pad being used inside the sole of a shoe.

FIG. 5 shows an embodiment of the present invention, showing a pad 510 being used inside a heel area of a shoe 500. The pad 510 contains suckers 510 similar to the other embodiments, arranged in a pattern. Similarly, to the embodiment in FIG. 3, the suckers 510 may be in contact with skin, or in contact with the user's sock. Friction is increased when the pad 510 is inserted into the shoe 500, thereby reducing the relative movement between the shoe 500 and the user's foot.

Figure 6:
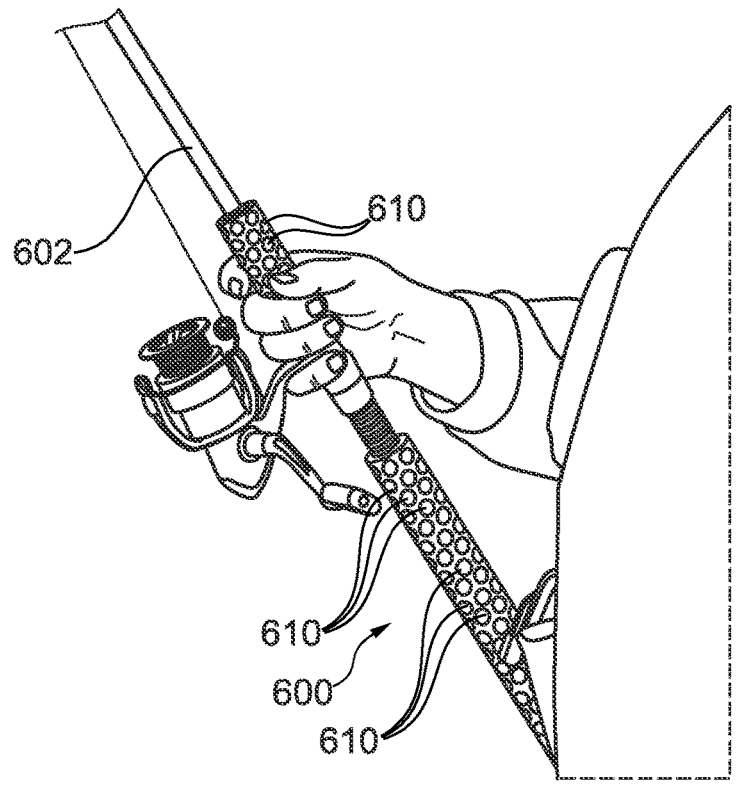
FIG. 6 shows an embodiment of the present invention, showing tape wrapped around the handle of a fishing rod.

FIG. 6 shows an embodiment of the present invention, showing tape 600 wrapped around a fishing rod handle 602. Suckers 610 can be seen arranged in a regular pattern. The suckers 610 work well when wet, increasing the available grip to the user. This is important in sports such as fishing, where the user's hands are often wet due to the nature of the sport.

Although not shown, the tape 600 may also comprise a range of recessed channel regions which have been found to be extremely effective in dissipating moisture and/or sweat away from the grip tape 600 and a user. The recessed channel regions are elongate indentations into the grip 600 which allow moisture and/or sweat to stream away.

Figure 7:
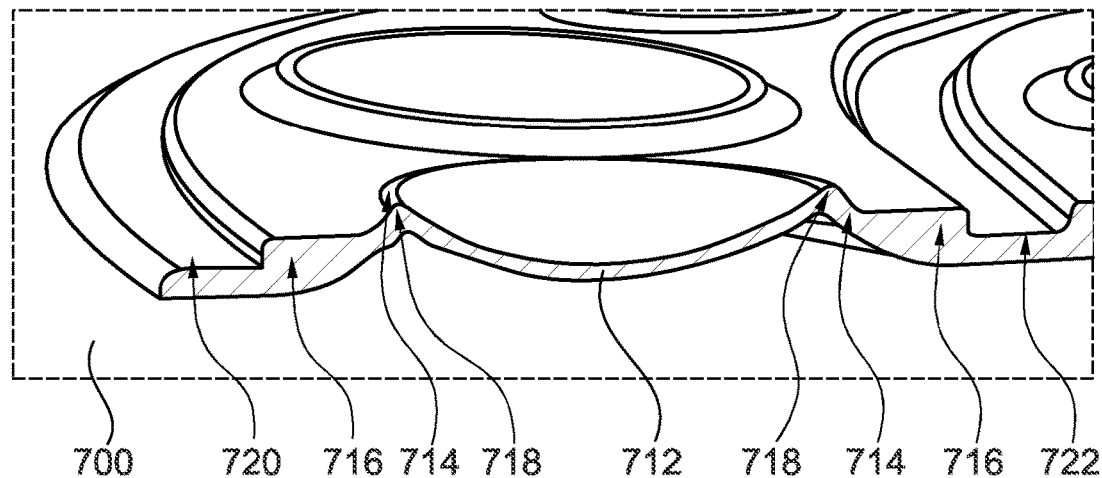
FIG. 7 shows a sectional view of another embodiment of the present invention, showing an enlarged view of the suckers.

FIG. 7 shows a sectional view of another embodiment of the present invention, showing an enlarged view of the suckers 712 located on a pad 700. The pad 700 section is made from any suitable silicone, silicone-like, rubber, rubber-like and/or plastics material e.g. a silicone-based material. As shown on the pad section 700 there is a concave sucker 712 with a side wall pointing inwards. The sucker 712 is located on a raised island 716. There are also shown recessed channel regions 720, 722. The recessed channel regions 720, 722 have been found to be extremely effective in dissipating moisture and/or sweat away from a user.

The top 718 of the side walls 714 is flat to ensure comfort for a user. The upper surface of the concave dome 712 is smooth with no undercuts on the side walls 714 which allows the whole pad section 700 to be evenly compressed under pressure.

Therefore, FIG. 7 shows the circular shaped side walls 712 sloping inwards to the central part of the sucker 712, and protruding from the top face. The base of the side wall 714 is wider than the top portion, which has been found to optimise the gripping/sucking action. The side wall 714 is therefore wider at the bottom and tapers in reduced width towards the top of the sidewall 714.

The thickness of the sidewall 714 therefore varies from the bottom where it is maximum, to the top where it is minimum. This has been shown to provide excellent grip, whilst maintaining improved comfort for the user.

Figure 8:
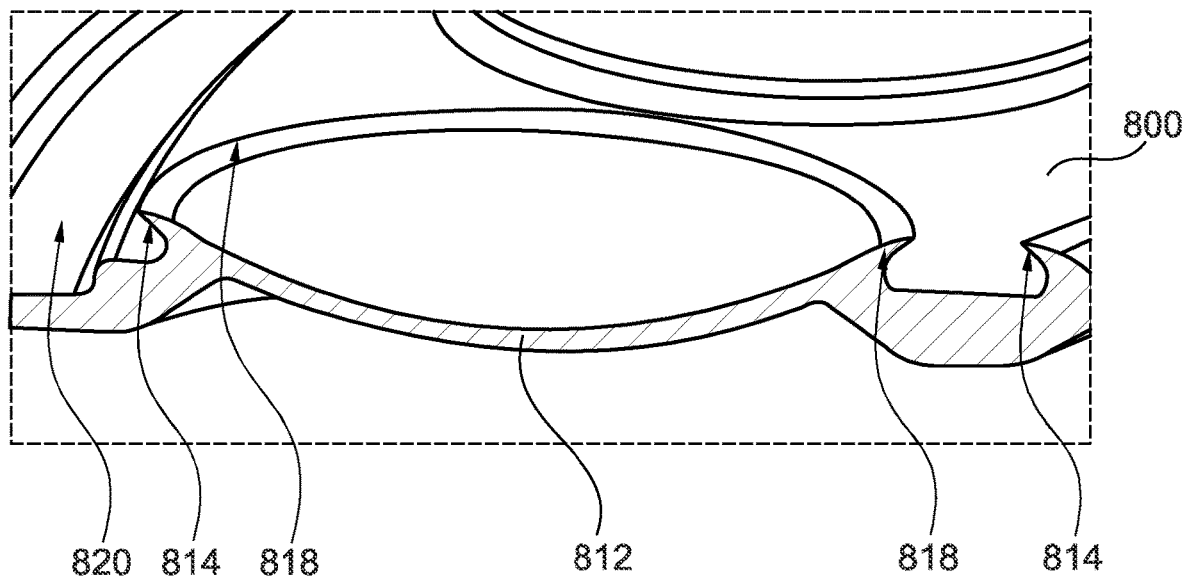
FIG. 8 shows a sectional view of prior art, showing an enlarged view of a sucker.

FIG. 8 shows a further pad section 800 according to the prior art. The pad section 800 is made from any suitable silicone, silicone-like, rubber, rubber-like and/or plastics material e.g. a silicone-based material. As shown on the pad section 800 there is a concave sucker 812. The sucker 812 has a side wall 814 which has been found to be less preferred due to the undercut. The top 818 of the side wall 814 is also not flat. It is important to note that due to the undercut in the side wall 814 which extends outwards away from the central part of the concave sucker 812 the pad section 800 when depressed has an uneven cross-sectional thickness and therefore does not provide maximum comfort to a user.

An advantage of this design shown in FIG. 7 is that the upper part of the side walls 714 are not able to fold back against themselves, and therefore form a superior suction and also provide greater comfort to a user. When pressure is applied to the suckers 712, the side walls 714 flatten out easily, without leaving an uncomfortable bump which the user may feel when using the sports industrial equipment. Preferably, the sidewalls 714 slope in to the centre of the sucker 712 at an angle of about 20-70 degrees, or preferably 30-70 degrees.

The suckers in the present application may have a diameter of about 0.2-2 cm, and preferably about 0.5-1 cm. The maximum depth of the concave shape is determined by the thickness of the material but may be about 0.05-5 mm, and preferably about 0.5-2 mm. The size of the suckers determines the amount of suction that may be achieved.

The suckers of the present invention may also have smooth edges, ensuring good grip/suction, and comfort for the user.

FIG. 8 shows a sectional view of prior art, showing an enlarged view of a sucker 812. The sucker 812 shown has side walls 814 which are concave, and has side walls 814 which are not flat/smooth. Both of these features make the suckers 814 uncomfortable for the user when pressure is applied. A specific advantage of the present invention of the suckers 712 shown in FIG. 7 is that the suckers of 712 slightly protrude out from the surface of the pad 700 and are located on, for example, a raised island 716. There are also shown recessed channel regions 720, 722. The recessed channel regions 720, 722 have been found to be extremely effective in dissipating moisture and/or sweat away from a user.

Therefore, the present invention generally covers raised suckers which may extend out from a surface of the pad by about 0.01-5 mm, about 0.01-2 mm, about 0.1-2 mm, about 0.1-1 mm. The suckers may be in the form as shown in FIG. 7 which have no undercuts of the sidewalls of the suckers. As previously stated, this allows the whole pad section to be evenly compressed under pressure with no 'flappy' part which can fold on top of itself to create an uneven surface i.e., as shown in FIG. 8. Located between the suckers there may be a plurality of recessed channels which are located and connected along the length of a grip and/or pad section. The plurality of recessed channels may allow moisture and/or sweat to easily dissipate away during use. The uses of the suckers may be all of the sporting uses described above as well as any industrial use.

The recessed channels may be integrally formed in the grip and/or pad section or may be scored into the grip and/or pad section once fitted.

Figure 9:
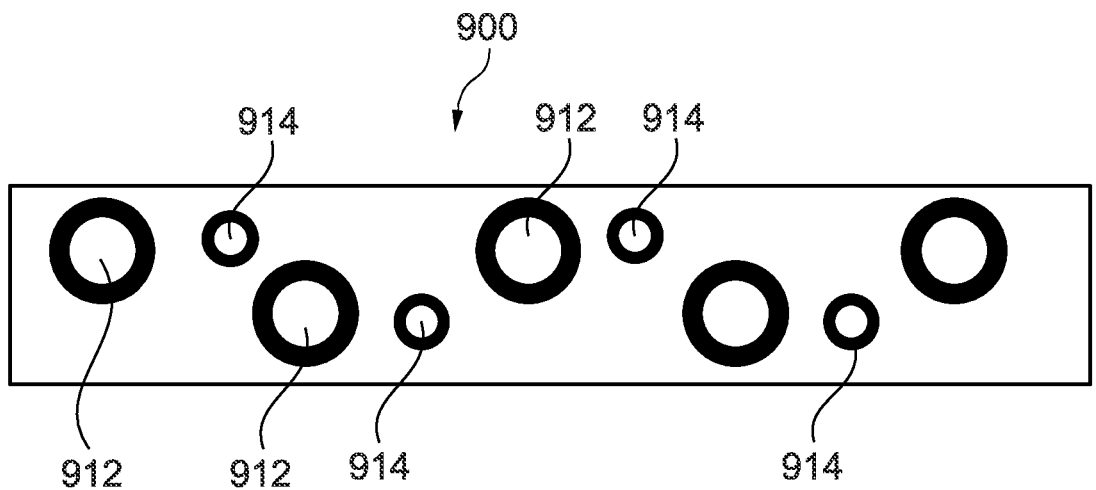
FIG. 9 shows an example pattern of suckers which may be used on tape according to the present invention.
Figure 10:
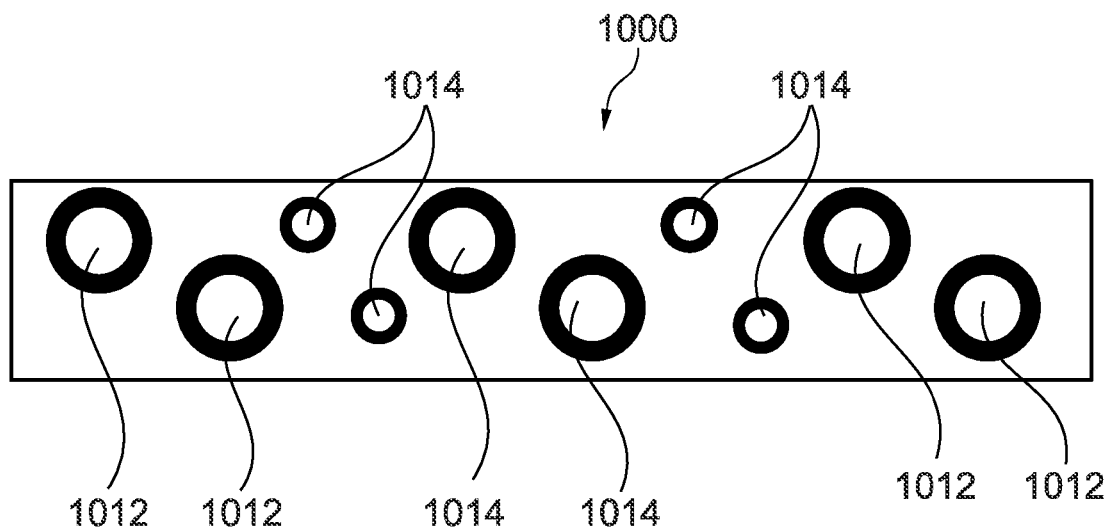
FIG. 10 shows another example pattern of suckers which may be used on tape according to the present invention.

FIGS. 9 and 10 show example patterns of suckers which may be used on tape 900, 1000 according to the present invention. Only a section of the tape 900 is shown to illustrate the pattern, the full tape as sold would be much longer than the piece shown. The tape would be designed to be cut to a suitable length. There are two types of suckers 912, 914 shown in the tape 900. As shown in FIG. 9, the different types of suckers 912, 914 alternate along the length of the tape 900 between the smaller diameter circle 914 and the larger diameter sucker 912. The suckers 912, 914 are also shown to be in a staggered arrangement with a larger sucker 912, then a small sucker 914 located in a linear manner and then in a parallel line a further large sucker 912 and a small sucker 914. The smaller diameter suckers 914 may also be smaller in depth, and the larger diameter suckers 912 may be larger in depth. For example, the smaller diameter suckers may have a depth of about 0.01 mm-2 mm and the larger diameter suckers may have a depth of greater than 2 mm such as about greater than 2 mm-5 mm.

FIG. 10 shows a different pattern arrangement for the two types of suckers 1012, 1014. The suckers 1012, 1014 may be arranged in a large number of different configurations. In FIG. 10, the pattern comprises two large suckers 1014 offset to one another then two offset smaller suckers 1014, and then two offset larger suckers 1012.

As previously described the suckers 912, 914, 1012, 104 shown in FIGS. 9 and 10 may protrude upwards by about 0.01-2 mm or about 0.1-2 mm from the surface of the tape allowing channels to occur between the suckers allowing moisture and/or sweat to dissipate away.

The pattern should allow the suckers 912, 914, 1012, 1014 to engage properly and securely with the user, whilst remaining comfortable and allowing moisture and/or sweat to escape from the grip/tape/pad.

Figure 11:
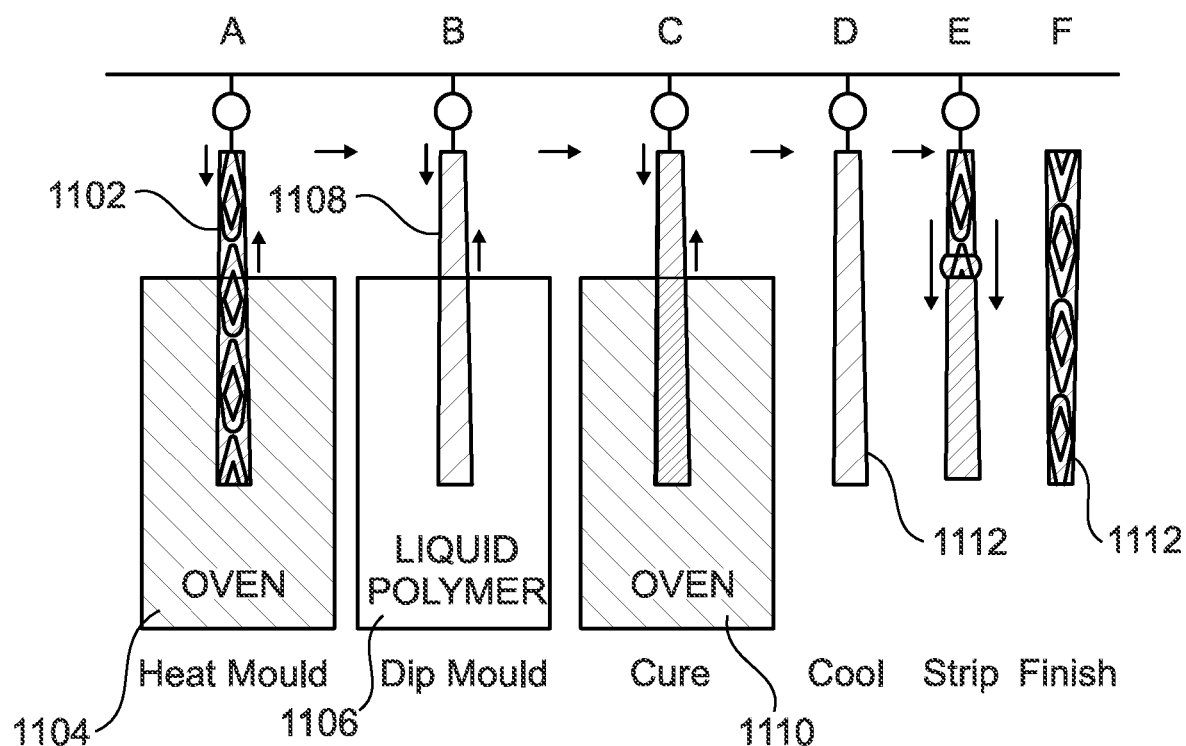
FIG. 11 shows an embodiment of the present invention, showing a dip moulding process for a tube grip which may be used to form tape.

FIG. 11 shows a dip coating process in which a grip according to the present invention may be formed. In process step A, there is an elongate cylindrical member 1102 which functions as a former or mandrel. The elongate member 1102 is heated up in an oven 1104. In process step B, the heated elongate cylindrical member 1102 is inserted into a dip mould 1106 which covers the elongate cylindrical member 1102 with liquid polymer. In process step C, there is a curing step by placing the coated elongate cylindrical member 1102 and an oven 1110. In process step D, the coated and cured elongate cylindrical member 1102 comprising coated polymer is allowed to cool. In process step E, the formed elongate grip member 1112 is removed from the elongate cylindrical member 1102. In process step F, there may be a finishing step on the removed and formed elongate grip member 1112. The elongate grip member 1112 may then be cut into a length of elongate tape which may be then wound onto a sporting or industrial article as described above.

Figure 12:
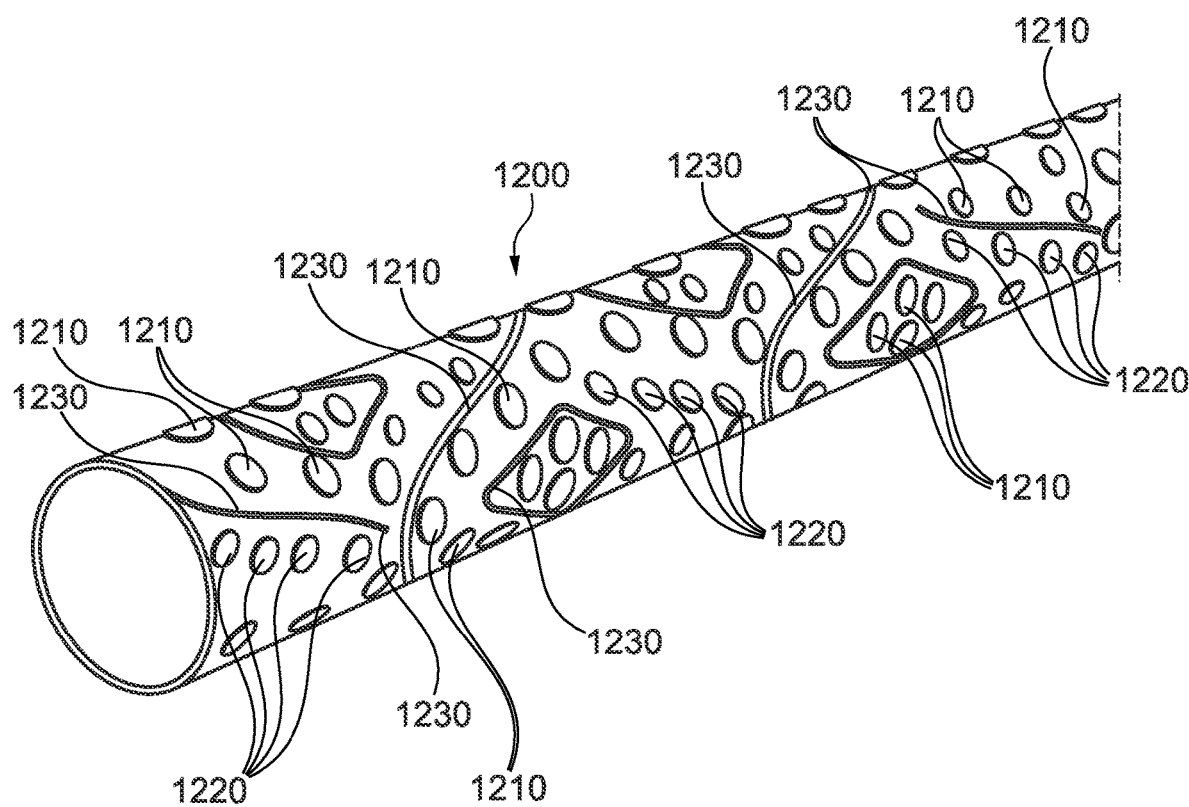
FIG. 12 shows a tube grip formed from wound tape according to the present invention where patterned suckers are shown on the surface of the grip.

FIG. 12 is a representation of a formed elongate grip member 1200 which may be formed during the process shown in FIG. 11. Alternatively, any other form of compression moulding or injection moulding process may be used. As shown in FIG. 12, there is a pattern formed between two sizes of suckers 1210, 1220. Suckers 1210 have larger cross-section diameter of about 5-20 mm or about 5-10 mm. Suckers 1220 have a smaller cross-section diameter of about 0.05-4 mm or about 0.1-4 mm. It is important to note that both types of suckers 1210, 1220 are concave in shape and protrude up from the surface of the elongate grip member 1200. This is similar to the arrangement shown in FIG. 7 wherein the suckers 1210, 1220 have a protruding circular section extending up from the elongate member 1200. Therefore, the suckers 1210, 1220 may extend out from a surface of the grip member 1200 by about 0.01-5 mm, about 0.01-2 mm, about 0.1-2 mm, or about 0.1-1 mm. The suckers may be in the form as shown in FIG. 7 which have no undercuts on the sidewalls of the suckers.

A further important feature of the grip member 1200 is the recessed channels 1230 which are interconnected and extend along down the length of the elongate grip member 1200. The recessed channels 1230 extend around and in between the arrangement of the suckers 1210, 1220. The recessed channels 1230 extend in a substantially longitudinal arrangement along and down the length of the elongate grip member 1200. The recessed channels 1230 form depressed channels into the elongate grip member 1200 by about 0.01-2 mm, about 0.01-1 mm, about 0.1-2 mm, about 0.1-1 mm, or about 0.5-1 mm.

The function of the recessed channels 1230 is to dissipate moisture and/or sweat away from a user. This improves the efficiency and/or performance of the grip and adhesion to a user. The recessed channels 1230 may be formed in the dip coating process shown in FIG. 11.

The recessed channel regions 1230 have been found to be extremely effective in dissipating moisture and/or sweat away from a user.

The grip member 1200 which is shown in an integral elongate tube member in FIG. 12 may then be cut such as in any circumferential or linear manner to form an elongate tape. The elongate tape may then be used as a grip and wound onto a range of sporting and industrial apparatus and/or devices.

Figure 13:
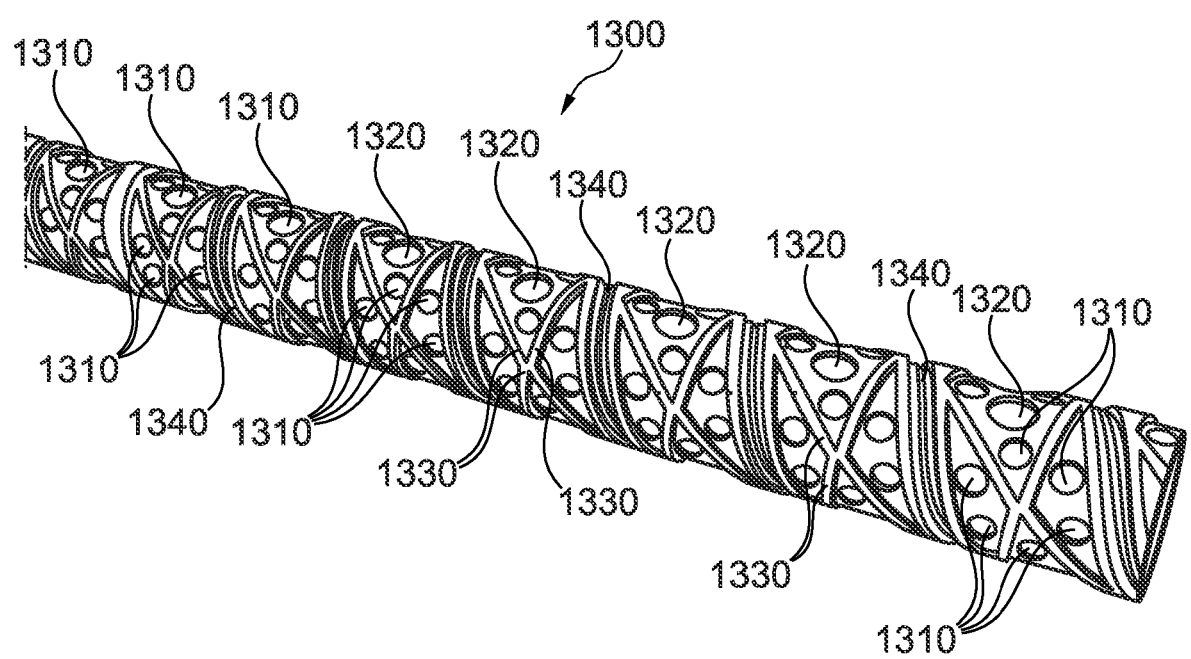
FIG. 13 shows a tube grip formed from wound tape according to the present invention, after being created on a cylinder.

FIG. 13 is a representation of an elongate grip member 1300 which has initial been formed into a tape-like structure. The tape has been wound onto an elongate sporting or industrial device and wound around in a circumferential manner. As shown in FIG. 13, elongate member 1300 comprises two different types of concave suckers 1310, 1320. Suckers 1310 are of a smaller cross-sectional diameter with suckers 1320 having a larger cross-sectional diameter. For example, the smaller diameter suckers may have a depth of about 0.01 mm-2 mm and the larger diameter suckers may have a depth of greater than 2 mm such as about greater than 2 mm-5 mm. Furthermore, the suckers 1310, 1320 protrude upwards by about 0.01-2 mm or about 0.1-2 mm from the surface of the tape 1300 allowing channels 1330 to occur between the suckers 1310, 1320 allowing moisture and/or sweat to dissipate away.

FIG. 13 also shows that in between the different portions of the elongate grip member 1300 as it is wound around comprises a circumferential channel 1340 extending around the wrapped sporting or industrial member.

Figure 14:
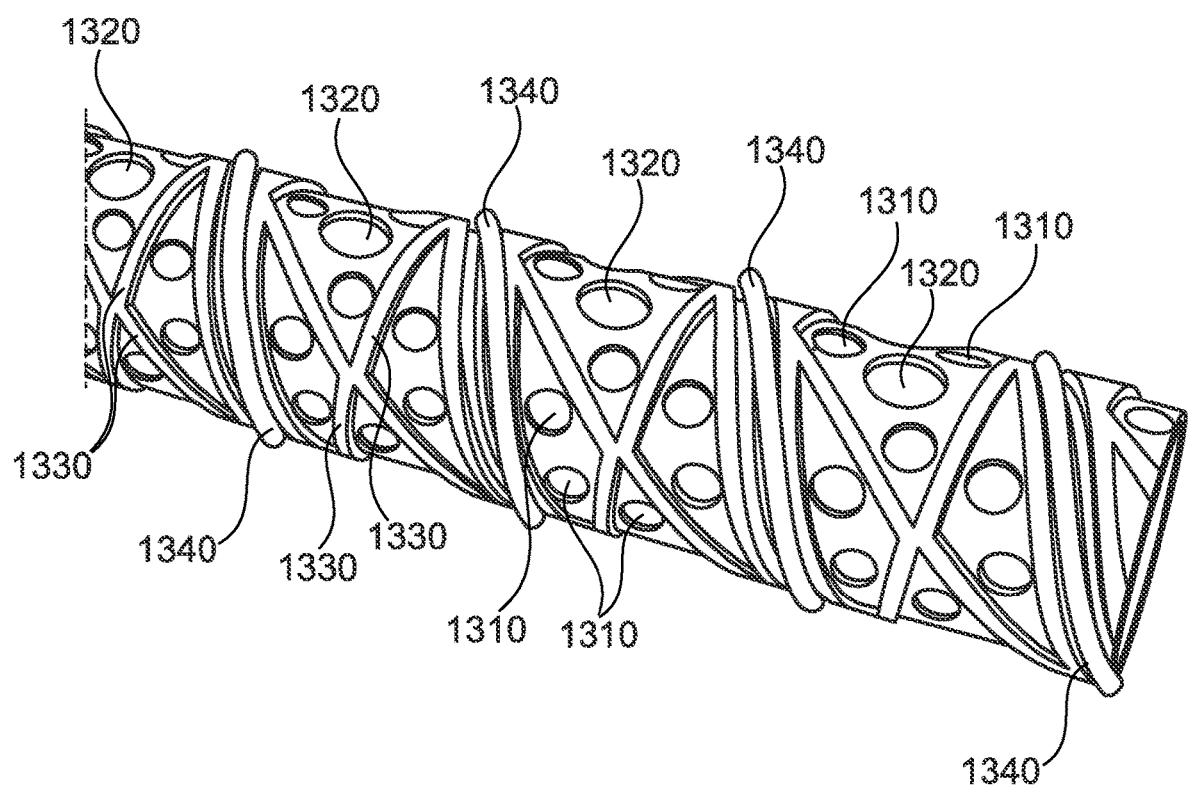
FIG. 14 shows the tube grip formed from wound tape according to FIG. 13, indicating where the cuts are to be made to create a tape from the tube.

FIG. 14 is an expanded view showing the suckers 1310, 1320 shown in FIG. 13. Additionally, FIG. 14 clearly shows the channels 1330 extending between the suckers 1310, 1320 and the second channel 1340 which extends around and along the length of the wrapped elongate grip member 1300 once it is wound onto a sporting or industrial member e.g. in a helical manner.

It has been found that having two different types of channel arrangements such as channel 1330 extending across and in between the suckers 1310, 1320 and a further additional channel in between the different wrapped portions of the elongate grip member 1300 has extremely efficient dissipation of water away from the grip member 1300 during use.

Figure 15:
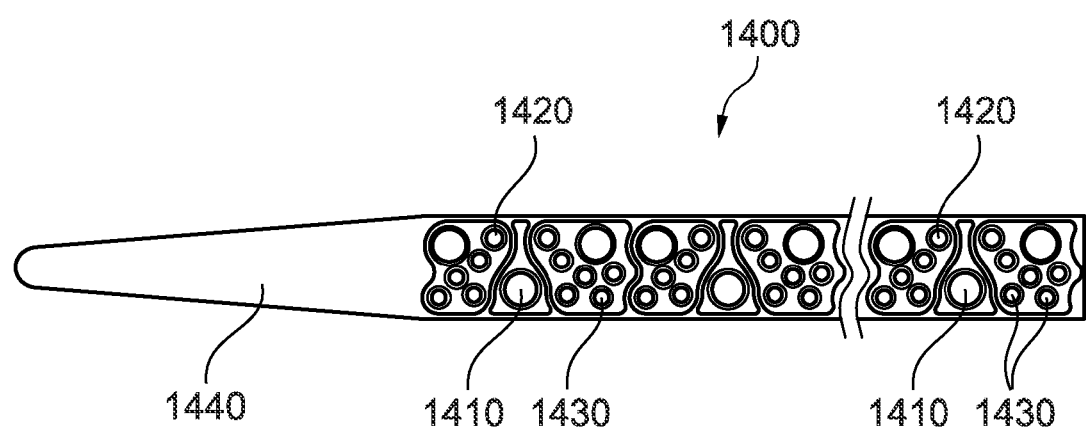
FIG. 15 shows a further grip formed from wound tape according to an embodiment of the present invention.

FIG. 15 is a representation of a further grip member 1400 according to the present invention. In this embodiment, the grip member 1400 comprises three different sizes of suckers. There is a small cross-sectional diameter sucker 1430, a mid-size sucker 1420 and a larger cross-sectional diameter sucker 1410. Located in between the suckers 1410, 1420, 1430 as previously described there is a series of channels allowing water and/or sweat to dissipate away.

FIG. 15 also shows that there is a pre-wrap portion 1440 which is initially wound onto the sporting apparatus or industrial member intended to be wrapped. The pre-wrap portion 1440 may provide additional comfort and/or adhesion.

Figure 16:
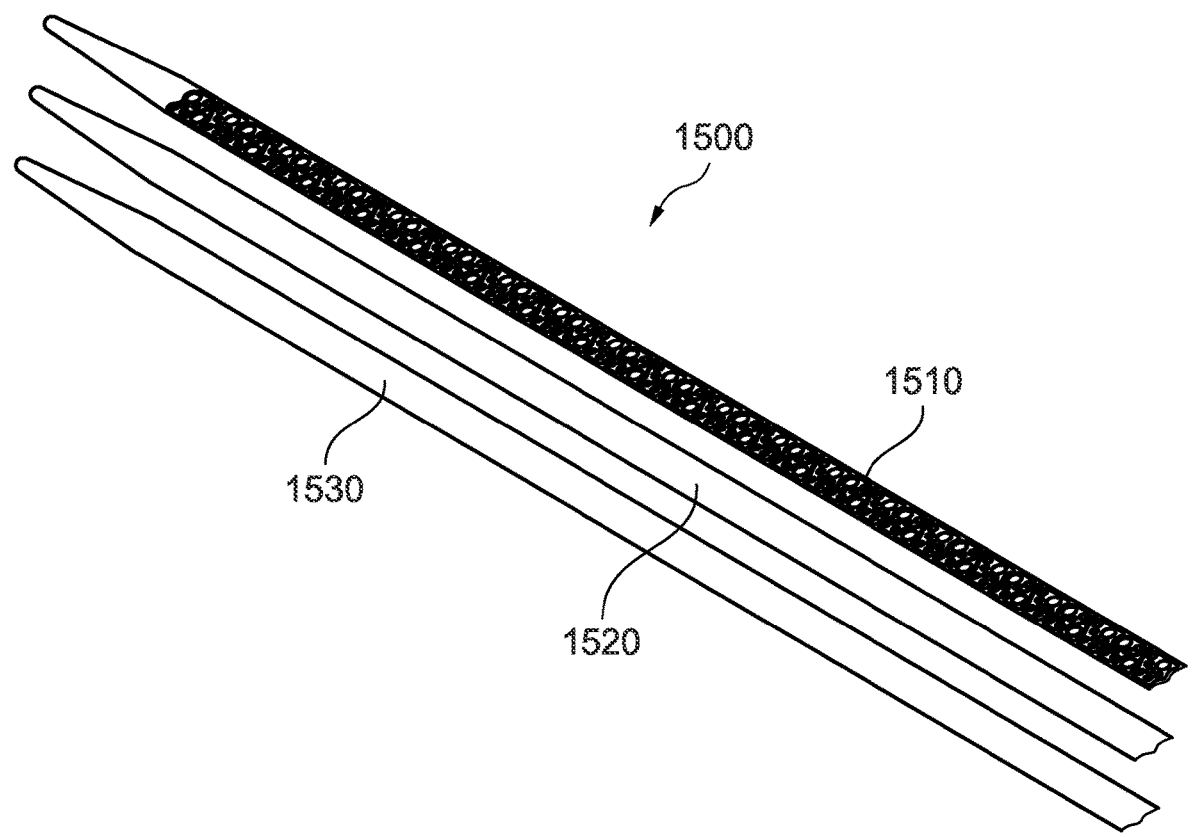
FIG. 16 shows different layers which are used to form a grip tape according to an embodiment of the present invention.

FIG. 16 shows a further grip member 1500 according to the present invention. As shown in FIG. 16, the grip member 1500 comprises three separate layers. There is an outer strip layer 1510 which comprises a series of suckers. There is then an intermediary adhesive layer 1520 which attaches the outer strip layer 1520 to an adhesive backing layer 1530. The grip member 1500 may be wound around any type of suitable sporting or industrial member to be wrapped.

Figure 17:
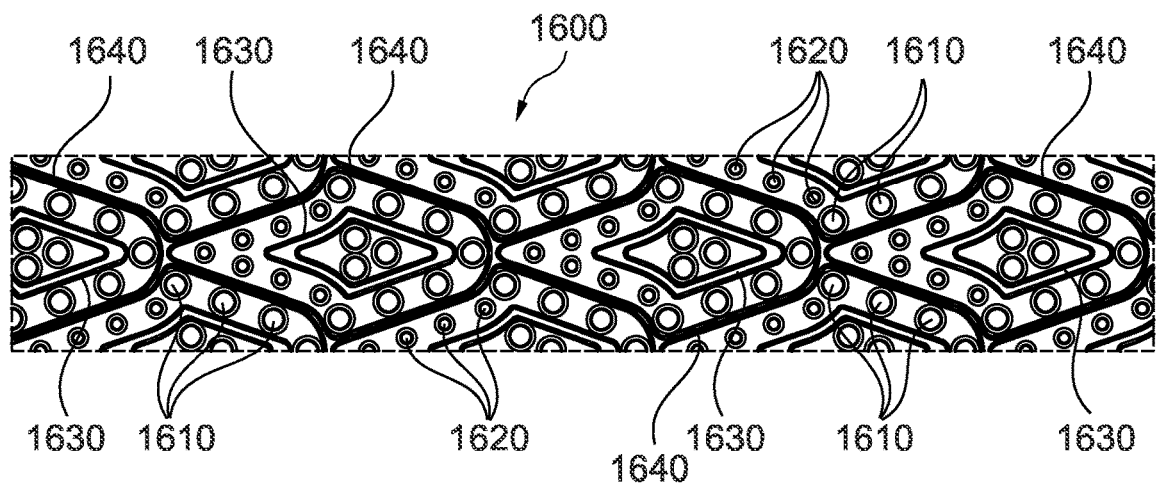
FIGS. 17 and 18 show further grip tapes according to embodiments of the present invention.

FIG. 17 shows a further grip member 1600 according to the present invention. As shown in FIG. 17, the grip member 1600 comprises two different sizes of suckers 1610, 1620.

First of all, there is the larger cross-sectional diameter sucker 1610 and a smaller cross-sectional diameter sucker 1620. There is a pattern formed between two sizes of suckers 1610, 1620. Suckers 1610 have larger cross-section diameter of about 5-20 mm or about 5-10 mm. Suckers 1620 have a smaller cross-section diameter of about 0.05-4 mm or about 0.1-4 mm.

It is important to note that both types of suckers 1610, 1620 are concave in shape and protrude up from the surface of the elongate grip member 1600. This is similar to the arrangement shown in FIG. 7 wherein the suckers 1610, 1620 have a protruding circular section extending up from the surface of the grip member 1600. Therefore, the suckers 1610, 1620 may extend out from a surface of the grip member 1600 by about 0.01-5 mm, about 0.01-2 mm, about 0.1-2 mm, about 0.1-1 mm. The suckers 1610, 1620 may be in the form as shown in FIG. 7 which have no undercuts of the sidewalls of the suckers.

FIG. 17 also shows that there are two different types of channel arrangements 1630, 1640 such as channel 1630 extending between the suckers 1610, 1620 and a further additional channel 1640 which is connected along down the length of the grip tape 1600.

Figure 18:
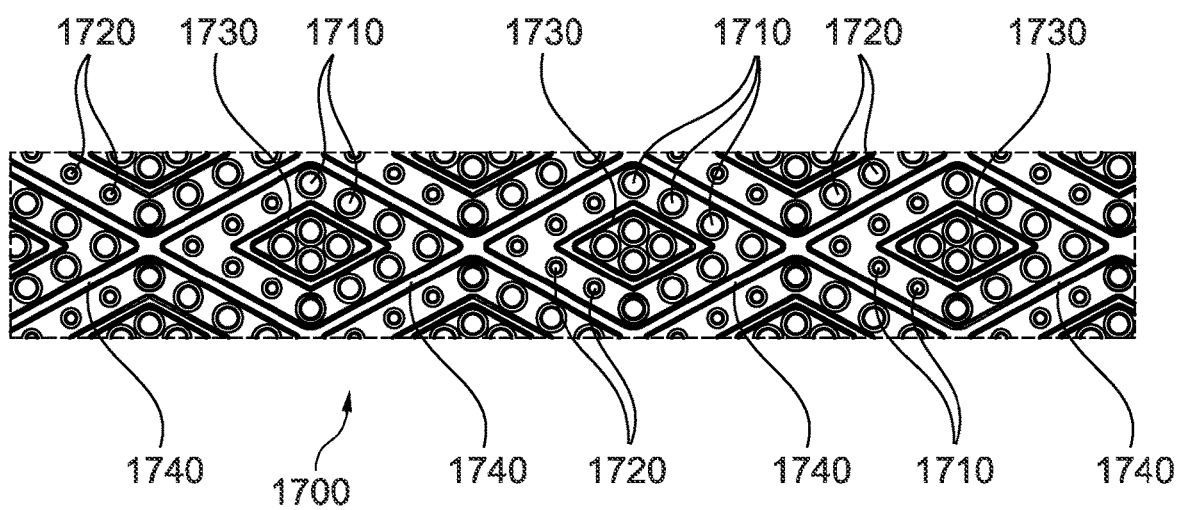

FIG. 18 shows a further grip member 1700 according to the present invention. As shown in FIG. 18, the grip member comprises two different sizes of suckers 1710, 1720. First of all, there is the larger cross-sectional diameter sucker 1710 and a smaller cross-sectional diameter sucker 1720. There is a pattern formed between two sizes of suckers 1710, 1720. Suckers 1710 have larger cross-section diameter of about 5-20 mm or about 5-10 mm. Suckers 1720 have a smaller cross-section diameter of about 0.05-4 mm or about 0.1-4 mm.

It is important to note that both types of suckers 1710, 1720 are concave in shape and protrude up from the surface of the elongate grip member 1700. This is similar to the arrangement shown in FIG. 7 wherein the suckers 1710, 1720 have a protruding circular section extending up from the elongate member 1200. Therefore, the suckers 1710, 1720 may extend out from a surface of the grip member 1200 by about 0.01-5 mm, about 0.01-2 mm, about 0.1-2 mm, about 0.1-1 mm. The suckers may be in the form as shown in FIG. 7 which have no undercuts of the sidewalls of the suckers.

FIG. 18 also shows that there are two different types of channel arrangements 1730, 1740 such as channel 1730 extending between the suckers 1710, 1720 and a further additional channel 1740 which is connected along down the length of the grip tape.

Figure 19:
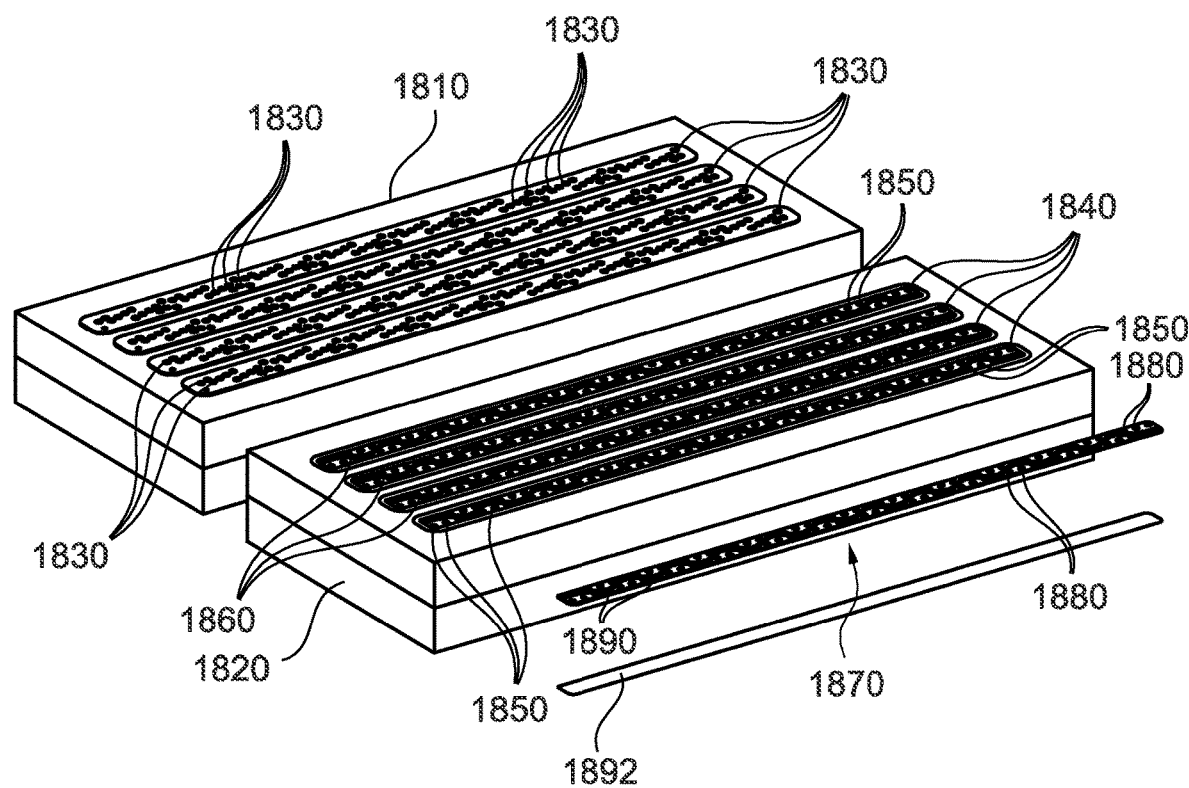
FIG. 19 is a representations of a compression tool according to an embodiment of the present invention wherein there is shown two sides of the compression tool.

FIG. 19 is a representation of a compression moulding tool according to an embodiment of the present invention. FIG. 19 shows that there are two parts 1810, 1820 of the compression moulding tool. Part 1810 and part 1820 form two separate halves of the compression moulding tool.

Part 1810 comprises a series of four elongate depressed sections 1830. There may be any number of elongate depressed sections. The elongate depressed sections 1830 also comprise a series of small indentations and/or protrusions 1840 which are used to form sucker elements as described in this invention. The formed suckers may be concave or convex in shape. Although not shown part 1810 may comprise a series of elongate sections with no small indentations and/or protrusions meaning that the formed tape may be flat on one side.

Part 1820 comprises a series of four elongate depressed sections 1840. The elongate depressed sections 1840 comprise a series of small indentations and/or protrusions 1850 which may be used to form sucker elements as described in this invention. Located along the elongate depressed sections 1840 is also showing a channel section 1860 which is used to form the channels on the tape 1870. There may be any number and a series and/or plurality of channels which may be interconnected.

The compression moulding tool shown in FIG. 19 may therefore be used to form a tape 1870. The tape is elongate and comprises a series of suckers 1880 on one side. There is also a channel 1890 extending along the tape 1870 which is used to allow moisture and/or sweat to dissipate away during use. It is optional whether suckers are formed on the other side of the tape as well. The tape 1817 may also comprise a backing layer 1892 which may be adhesive.

Figure 20:
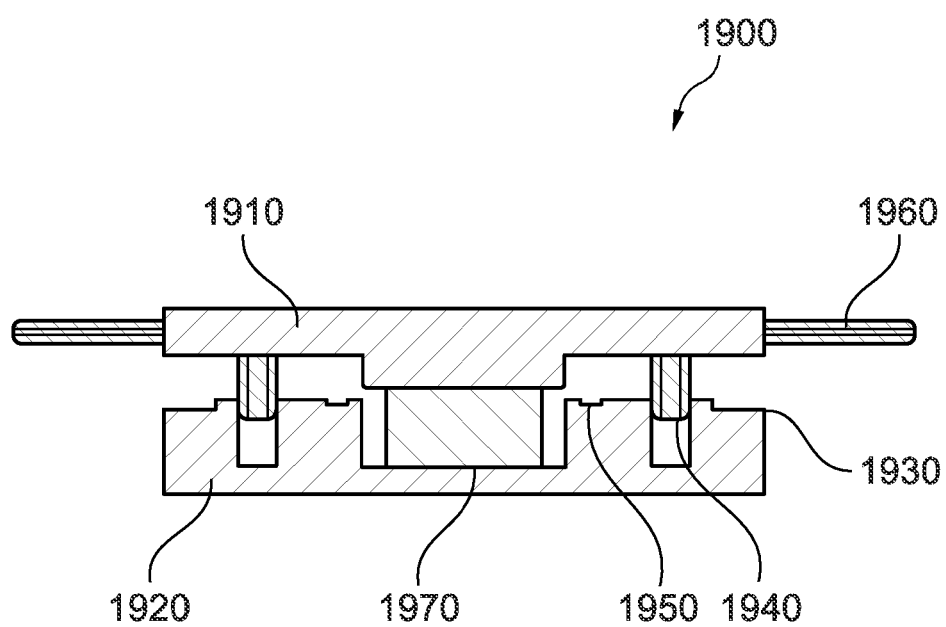
FIG. 20 is a representation of a compression moulding tool according to the present invention.

FIG. 20 is a representation of a compression moulding tool 1900 according to the present invention. The compression moulding tool 1900 comprises a top plate 1910 and a bottom plate 1920. On the top plate 1910 there is located a handle 1960 and a dowel pin and bushing 1940. On the bottom plate 1920 there is located a flash and tear trim gate 1950. Between the top plate 1910 and the bottom plate 1920 there is formed an opening bar slot 1930. Furthermore, between the top plate 1910 and the bottom plate 1920 there is a cavity area 1970 into which material may be placed to be compressed into an article such as a grip tape according to the present invention.

Figure 21:
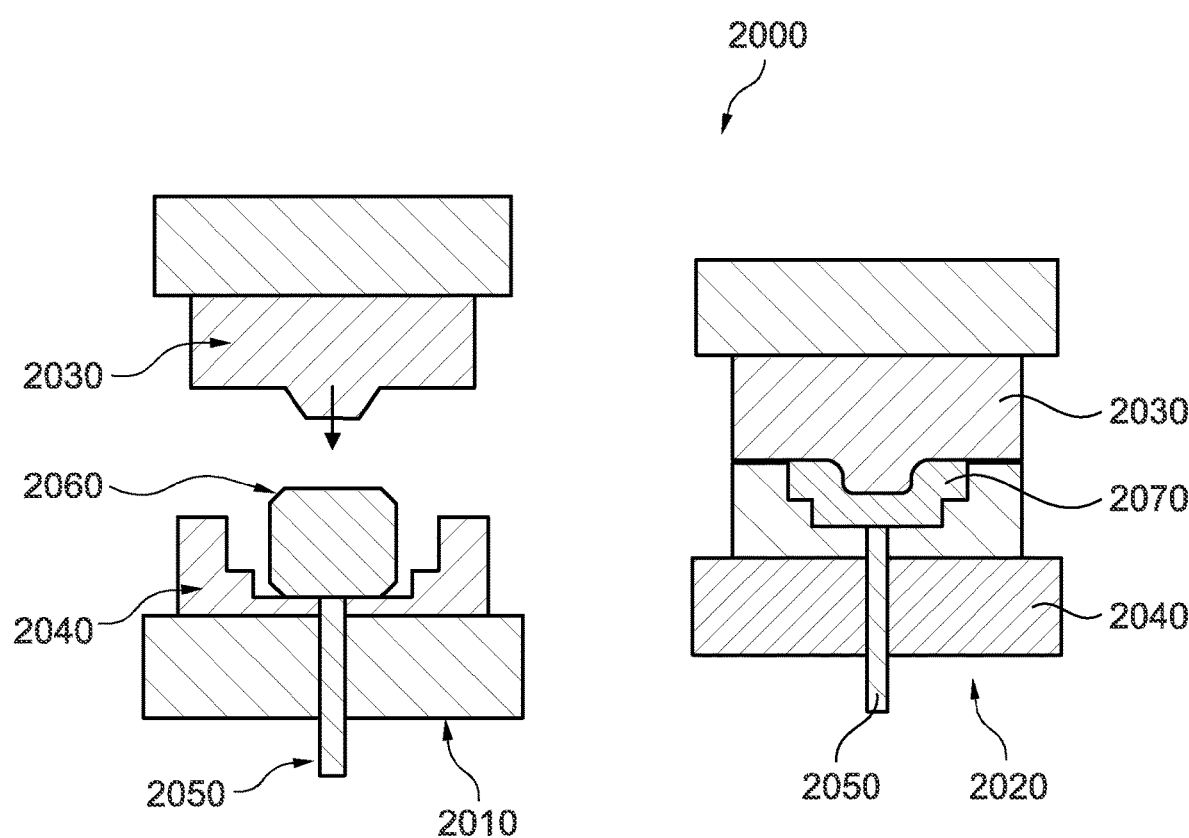
FIG. 21 is a representation of a further compression moulding tool according to the present invention.

FIG. 21 is a representation of a further compression moulding tool 2000 according to the present invention. The compression moulding tool 2000 comprises a first configuration 2010 and a second configuration 2020.

The first section 2010 comprises an upper movable mould half 2030 and a lower fixed mould half 2040. As shown in FIG. 21, there is an ejector pin 2050 which is able to force material 2060 (i.e. a charge) onto the upper movable mould 2030 to form a moulded article 2070. A moulded article 2070 may be an elongate tape according to the present invention.

In the first configuration 2010 the material 2060 (i.e. the charge) is placed between the upper movable mould 2030 and the lower fixed mould half 2040.

Whilst various exemplary embodiments have been disclosed, it shall be understood that variations, modifications and combinations of the tape and methods disclosed herein disclosed herein may be made without departing from the scope of the appended claims.

The invention claimed is:

1. A grip tape comprising:
a top face and a bottom face, wherein the bottom face is suitable for being wrapped around a handle or portion of on an item of a sports or industrial equipment;
a plurality of suckers located on the top face;
wherein at least one or a plurality of the suckers form a concave shape and are therefore capable of creating a suction action against a user when depressed under pressure, thereby improving the suction force between the user and the tape;
wherein the plurality of suckers comprise side walls which extend out from the top face forming the concave shape of the suckers and an outer surface of the side walls is sloped inwards towards a central part of the concave suckers, whereupon the base of the side wall is wider than the top portion which has been found to be optimal to increase the efficiency of the suction/gripping action; and
wherein the side walls comprise no undercuts, thus allowing the suckers to be evenly compressed under pressure;
wherein the tape is in the form of an adhesive elongate tape which is capable of being wound around a sports or industrial article where improved grip is required; and
wherein the suckers are arranged in a pattern to allow moisture and/or sweat to escape from the tape.

2. A grip tape according to claim 1, wherein the grip tape also comprises a range of recessed channel regions in the form of elongate indentations into the grip tape which allow moisture and/or sweat to stream away.

3. A grip tape according to claim 1, wherein the suckers are located on raised island regions with recessed channel regions located between the island regions.

4. A grip tape according to claim 1, wherein the plurality of suckers may have circular shaped sidewalls i.e. circular diametric cross-section.

5. A grip tape according to claim 1, wherein the top of the side walls is flat to ensure comfort for a user and the upper surface of the concave sucker is smooth.

6. A grip tape according to claim 1, wherein the sidewalls slope in to the centre of the sucker at an angle of about 20-70 degrees, or about 30-70 degrees.

7. A grip tape according to claim 1, wherein the suckers have a diameter of about 0.2-2 cm, or about 0.5-1 cm and the maximum depth of the concave shape is about 0.05-5 mm or about 0.5-2 mm.

8. A grip tape according to claim 1, wherein the suckers extend out from a surface of a pad on the grip tape by about 0.01-5 mm, about 0.01-2 mm, about 0.1-2 mm or about 0.1-1 mm.

9. A grip tape according to claim 1, wherein the grip tape and suckers are made from a silicone, silicone-like rubber, rubber-like and/or plastics material and is flexible and resiliently deformable.

10. A grip tape according to claim 1, wherein the tape is stored on a roll.

11. A grip tape according to claim 1, wherein the pattern of the suckers alternates along the length of the tape between a larger diameter sucker and a smaller diameter sucker.

12. A grip tape according to claim 1, wherein the grip tape comprises a backing membrane which the plurality of suckers are attached to; and
wherein the membrane is made from a woven or non-porous material and the suckers are made from a rubber, rubber-like and/or plastics material.

13. A method for manufacturing a grip tape according to claim 1 using a compression moulding process comprising:
providing a first part and a second part which form two separate halves of a compression moulding tool;
the first part comprising a series of elongate depressed sections;
the second part comprising a further series of elongate depressed sections which comprise a series of small indentations and/or protrusions which are capable of forming sucker elements; and
wherein the second part also comprises a series of channel sections.

14. A sports grip comprising:
an elongated, substantially cylindrical grip element;
wherein the grip element comprises a top face and a bottom face, wherein the bottom face is suitable for being attached to a handle on an item of sports equipment
a plurality of suckers located on the top face;
wherein the suckers form a concave shape and are therefore capable of creating a suction action against a user when depressed under pressure, thereby improving the suction force between the user and the grip;
wherein the plurality of the suckers have circular shaped side walls which extend out from the top face forming the concave shape of the suckers;
wherein an outer surface of the side walls are sloped inwards towards a central part of the concave suckers, whereupon the base of the side wall is wider than the top portion which has been found to be optimal to increase the efficiency of the suction/gripping action; and
wherein the side walls comprise no undercuts, thus allowing the suckers to be evenly compressed under pressure; and
wherein the suckers are arranged in a pattern to allow moisture to escape from the grip.

15. A method for manufacturing a grip according to claim 14, using a compression moulding process comprising:
providing a top plate and a bottom plate which are capable of being forced against one another;
a cavity section formed between the top plate and the bottom plate into which material to be compressed is capable of being inserted; and
whereupon on compression of the top and bottom plate material inserted into the cavity section is formed into a tape or article.

* * * * *